(12) United States Patent
Cho

(10) Patent No.: US 10,826,161 B2
(45) Date of Patent: Nov. 3, 2020

(54) ANTENNA MODULE AND METHOD OF MANUFACTURING THE SAME

(71) Applicant: LS MTRON LTD., Anyang-si (KR)

(72) Inventor: Sung Bok Cho, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 0 days.

(21) Appl. No.: 16/511,421

(22) Filed: Jul. 15, 2019

(65) Prior Publication Data

US 2020/0028243 A1 Jan. 23, 2020

(30) Foreign Application Priority Data

Jul. 17, 2018 (KR) .................. 10-2018-0083111
Jul. 20, 2018 (KR) .................. 10-2018-0084636

(51) Int. Cl.
*H01Q 1/38* (2006.01)
*H01Q 1/24* (2006.01)
(Continued)

(52) U.S. Cl.
CPC ............... *H01Q 1/243* (2013.01); *H01Q 1/38* (2013.01); *B29C 45/14* (2013.01); *H01Q 1/36* (2013.01); *H01Q 1/52* (2013.01)

(58) Field of Classification Search
CPC ... H01Q 1/36; H01Q 1/38; H01Q 1/52; B29C 45/14
See application file for complete search history.

(56) References Cited

U.S. PATENT DOCUMENTS 8,260,385 B2* 9/2012 Kim .................. H01Q 1/2266
455/575.7
9,266,266 B2* 2/2016 Hong ................ B29C 45/14065
(Continued)

FOREIGN PATENT DOCUMENTS

JP 2008158219 A 7/2008
JP 2009159588 A 7/2009
(Continued)

OTHER PUBLICATIONS

European Search Report for related European Application No. 19185292.0; dated Nov. 28, 2019; (11 pages).
(Continued)

*Primary Examiner* — Thuy Vinh Tran
(74) *Attorney, Agent, or Firm* — K&L Gates LLP

(57) ABSTRACT

An antenna module includes a base frame and a conductive pattern disposed on the base frame, wherein the conductive pattern includes a first conductor layer disposed on the base frame, a second conductor layer disposed on the first conductor layer, and a third conductor layer disposed on the second conductor layer. A surface of the conductive pattern has an areal roughness expressed by an arithmetical mean height (Sa) ranging from 4.7 μm to 5.7 μm and a maximum height (Sz) ranging from 40 μm to 55 μm. In addition, a method of manufacturing the antenna module is also disclosed. It includes manufacturing a base frame having a radiator region and forming a radiator in the radiator region, wherein the forming of the radiator includes forming a first conductor layer on an uneven portion of the base frame, forming a second conductor layer on the first conductor layer, and forming a third conductor layer on the second conductor layer.

20 Claims, 18 Drawing Sheets

(51) Int. Cl.
  *H01Q 1/52* (2006.01)
  *H01Q 1/36* (2006.01)
  *B29C 45/14* (2006.01)

(56) References Cited

U.S. PATENT DOCUMENTS

| | | | |
|---|---|---|---|
| 2008/0067715 A1* | 3/2008 | Sung | B29C 45/14811 264/279 |
| 2011/0165915 A1 | 7/2011 | Kim et al. | |
| 2014/0106085 A1 | 4/2014 | Cho et al. | |
| 2020/0128115 A1* | 4/2020 | Kang | H05K 5/0239 |

FOREIGN PATENT DOCUMENTS

| | | |
|---|---|---|
| JP | 2014082747 A | 5/2014 |
| JP | 2014220390 A | 11/2014 |
| KR | 20110128764 A | 11/2011 |
| KR | 20140106862 A | 9/2014 |
| KR | 101557276 B1 | 10/2015 |
| KR | 101570641 B1 | 11/2015 |

OTHER PUBLICATIONS

Japanese Office Action for related Japanese Application No. 2019-131200; action dated Sep. 16, 2020; (3 pages).

* cited by examiner

ANTENNA MODULE AND METHOD OF MANUFACTURING THE SAME

PRIORITY STATEMENT

This application claims benefit and priority under 35 U.S.C. § 119 to Korean Patent Application No. 10-2018-0083111, filed on Jul. 17, 2018 and Korean Patent Application No. 10-2018-0084636, filed on Jul. 20, 2018, the entire contents of each of which are being incorporated herein by reference.

FIELD OF TECHNOLOGY

The present invention relates to an antenna module and, more particularly, to an antenna module applied to a portable terminal.

BACKGROUND

Antennas for transmitting and receiving radio waves are installed in communication terminals. For example, antennas for transmitting and receiving radio waves are installed in portable communication terminals, such as portable phones or radio sets.

With the trend that communication terminals are becoming compact and lightweight, antennas are also becoming compact and lightweight. Recently, internal antennas embedded in devices have been used widely.

For example, Korean Patent Publication No. 2005-0013705 discloses an internal antenna device for a portable terminal. FIG. 1 is a schematic exploded perspective view showing an example of the conventional internal antenna device. The internal antenna device shown in FIG. 1 includes a shield plate 10 coated with a conductive material and grounded to a ground in a certain region of an inner surface of a terminal, an antenna plate 20 installed opposite to the shield plate 10, and a carrier 30 interposed between the shield plate 10 and the antenna plate 20. However, in the case of an inner antenna having such a structure, since the shield plate 10, the antenna plate 20, the carrier 30, and a printed circuit board (not shown) connected to the antenna plate are each separately manufactured and assembled, a manufacturing process is cumbersome, and the manufacturing cost is high.

As another example of the conventional inner antenna device, an antenna module is known in which a conductive pattern serving as a radiator for transmitting and receiving radio waves is directly formed in a certain region of a base frame. However, when an adhesive force between the conductive pattern and the base frame is insufficient, a precise pattern may be difficult to form, the conductive pattern may be peeled off of the base frame, or the antenna module may fail due to remains or the like of a metal material for forming the conductive pattern.

Therefore, the present invention is designed to solve the problems and is directed to providing an antenna module and a method of manufacturing the same.

The present invention is directed to providing an antenna module having high stability and reliability due to a conductive pattern, which serves as a radiator for transmitting and receiving radio waves, being stably attached to a base frame.

The present invention stably attaches a conductive pattern to a base frame by adjusting surface shapes and areal roughnesses of the base frame and the conductive pattern.

Besides the aspects of the present invention as mentioned above, additional advantages and features of the present invention will be set forth in the description which follows or will become apparent to those having ordinary skill in the art from the following description.

SUMMARY

An antenna module according to an embodiment of the present invention may include a base frame and a conductive pattern disposed on the base frame, wherein the conductive pattern includes a first conductor layer disposed on the base frame, a second conductor layer disposed on the first conductor layer, and a third conductor layer disposed on the second conductor layer. Here, a surface of the conductive pattern may have an areal roughness expressed by an arithmetical mean height (Sa) ranging from 4.7 μm to 5.7 μm and a maximum height (Sz) ranging from 40 μm to 55 μm.

The first conductor layer may include at least one of among nickel (Ni), molybdenum (Mo), and titanium (Ti).

The first conductor layer may have a thickness ranging from 0.2 μm to 2 μm.

The second conductor layer may include at least one of copper (Cu) and aluminum (Al).

The second conductor layer may have a thickness ranging from 8 μm to 17 μm.

The third conductor layer may include at least one of nickel (Ni), molybdenum (Mo), and titanium (Ti).

The third conductor layer may have a thickness ranging from 1 μm to 7 μm.

The first conductor layer and the third conductor layer may be in contact with each other at an edge of the conductive pattern.

A width of the first conductor layer and a width of the third conductor layer may be greater than a width of the second conductor layer between one end at which the first conductor layer and the third conductor layer are in contact with each other and the other end at which the first conductor layer and the third conductor layer are in contact with each other in any one direction in a plan view. A width of the first conductor layer and a width of the third conductor layer may be greater than a width of the second conductor layer, in at least one direction.

A thickness of the edge of the conductive pattern, at which the first conductor layer and the third conductor layer are in contact with each other, may be greater than a thickness of each of the first conductor layer and the third conductor layer at portions excluding the edge of the conductive pattern.

The first conductor layer and the third conductor layer may be in contact with each other at the edge of the conductive pattern to form a closed space, and the second conductor layer may be disposed in the closed space formed by the first conductor layer and the third conductor layer. The second conductor layer may be disposed on the first conductor layer in a region excluding an edge of the first conductor layer, and the third conductor layer may be in contact with the first conductor layer at the edge of the first conductor layer.

The conductive pattern may further include a seed layer disposed between the base frame and the first conductor layer.

The seed layer may include at least one of palladium (Pd) and tin (Sn).

The base frame may include an uneven portion having a hill and a valley, and the conductive pattern may be disposed on the uneven portion.

An average of three to seven hills and an average of three to seven valleys per a length of 500 µm may be formed in the base frame in any one direction thereof.

The base frame may have holes formed in surfaces of the hill and the valley of the uneven portion.

The hole may have a depth ranging from 3 µm to 30 µm.

The base frame may have a pore formed in a surface of the hole.

The pore may have a depth ranging from 0.3 µm to 3 µm.

The conductive pattern may further include the seed layer formed in the pore.

The conductive pattern may be a radiator which transmits or receives radio waves.

An antenna module according to another embodiment of the present invention may include a base frame and a radiator disposed on the base frame, wherein the radiator includes a first conductor layer disposed on the base frame, a second conductor layer disposed on the first conductor layer, and a third conductor layer disposed on the second conductor layer.

A surface of the radiator may have an areal roughness expressed by an arithmetical mean height (Sa) ranging from 4.7 µm to 5.7 µm and a maximum height (Sz) ranging from 40 µm to 55 µm.

The first conductor layer and the third conductor layer may be in contact with each other at an edge of the radiator.

The first conductor layer and the third conductor layer may be in contact with each other at the edge of the radiator to form a closed space, and the second conductor layer may be disposed in the closed space formed by the first conductor layer and the third conductor layer.

A method of manufacturing an antenna module according to still another embodiment of the present invention may include manufacturing a base frame including an uneven portion with a hill and a valley, forming a plurality of holes in a surface of the uneven portion, forming a pore in a surface of the hole, and forming a conductive pattern on the uneven portion, wherein the forming of the conductive pattern includes forming a first conductor layer on the uneven portion, forming a second conductor layer on the first conductor layer, and forming a third conductor layer on the second conductor layer.

The conductive pattern may have the same surface shape as the uneven portion with respect to a cross section.

The base frame may be formed by injection using a mold, and the mold may have an engraved pattern and an embossed pattern respectively corresponding to the hill and the valley of the uneven portion.

A distance between adjacent holes among the plurality of holes may be in a range of 5 µm to 10 µm.

The forming of the holes may include irradiating a laser on the uneven portion.

The forming of the pore may include, after the forming of the holes, treating the base frame with a solvent.

The solvent may have an acidity ranging from pH 0.5 to pH 5.

The treating of the base frame with the solvent may include immersing the base frame in the solvent and applying ultrasonic waves having a frequency ranging from 20 Hz to 50 Hz.

The forming of the conductive pattern may further include, prior to the forming of the first conductive layer, forming a seed layer in the pore.

A method of manufacturing an antenna module according to yet another embodiment of the present invention may include manufacturing a base frame having a radiator region and forming a radiator in the radiator region, wherein the manufacturing of the base film includes forming an uneven portion having a hill and a valley in the radiator region, forming a plurality of holes in surfaces of the hill and the valley, and forming a pore in a surface of the hole, and the forming of the radiator includes forming a first conductor layer on the uneven portion, forming a second conductor layer on the first conductor layer, and forming a third conductor layer on the second conductor layer.

An electronic device according to yet another embodiment of the present invention may include an antenna module including a base frame and a conductive pattern disposed on the base frame, wherein the conductive pattern includes a first conductor layer, a second conductor layer disposed on the first conductor layer, and a third conductor layer disposed on the second conductor layer, and a surface of the conductive pattern has an areal roughness expressed by an arithmetical mean height (Sa) ranging from 4.7 µm to 5.7 µm and a maximum height (Sz) ranging from 40 µm to 55 µm.

General description related to the present invention given above serves to illustrate or disclose the present invention and should not be construed as limiting the scope of the present invention.

According to an embodiment of the present invention, surface shapes and areal roughnesses of a base frame and a conductive pattern constituting an antenna module are adjusted to a certain range. Therefore, the conductive pattern is stably attached to the base frame. The conductive pattern serving as a radiator for transmitting and receiving radio waves is stably attached to the base frame, thereby preventing defects of the antenna module caused by separation of the radiator.

In addition, since the conductive pattern is stably attached to the base frame, a radiator having a fine pattern can be manufactured. Further, since a conductive material forming the conductive pattern is prevented from being diffused or unnecessarily remaining, performance of the antenna module is stably maintained.

BRIEF DESCRIPTION OF THE DRAWINGS

The accompanying drawings, which are included to provide a further understanding of the present invention and are incorporated in and constitute a part of this application, illustrate embodiments of the present invention and serve to explain the principle of the invention together with the description.

DETAILED DESCRIPTION

Figure 1:
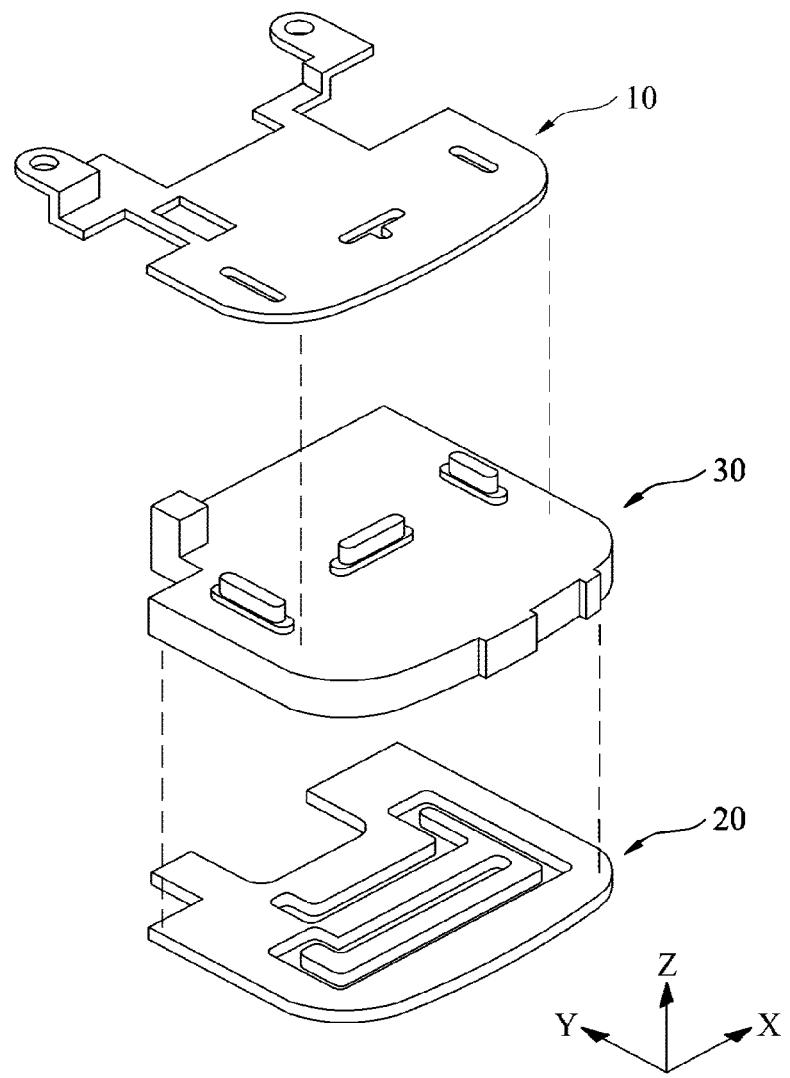
FIG. 1 is a schematic exploded perspective view showing an example of a conventional internal antenna device.

Hereinafter, embodiments of the present invention will be described in detail with reference to the accompanying drawings.

It will be apparent to those skilled in the art that various modifications and variations can be made in the present invention without departing from the spirit and scope of the present invention. Thus, it is intended that the present invention covers the modifications and variations of this invention provided they come within the scope of the appended claims and their equivalents.

The shapes, sizes, ratios, angles, numbers, and the like illustrated in the accompanying drawings for describing the exemplary embodiments of the present invention are merely examples, and the present invention is not limited thereto. Like reference numerals generally denote like elements throughout the present specification.

The terms such as "including," "having," and "consist of" used herein are generally intended to allow other components to be added unless the terms are used with the term "only." Any references to the singular may include the plural unless expressly stated otherwise. Components are interpreted to include an ordinary error range even if not expressly stated.

When the position relation between two portions is described using terms such as "on," "above," "below," and "next," one or more portions may be positioned between the two positions unless the terms are used when the term "immediately" or "directly" is not used.

When the description of the time sequential relation includes "after," "followed by," "next," "before," etc., non-continuous cases may be included unless "right" or "direct" is used.

The first, second, etc., may be used to describe various components, but these components are not limited by these terms. These terms are only used to distinguish one element from the other components. Thus, the first component referred to below may be a second component within the scope of the present invention.

The term "at least one" needs to be understood to include any combination possible from one or more related items.

Features of various embodiments of the present invention may be partially or overall coupled to or combined with each other and may be variously inter-operated with each other and driven technically. The embodiments of the present invention may be carried out independently from each other or may be carried out together in a co-dependent relationship.

Figure 2:
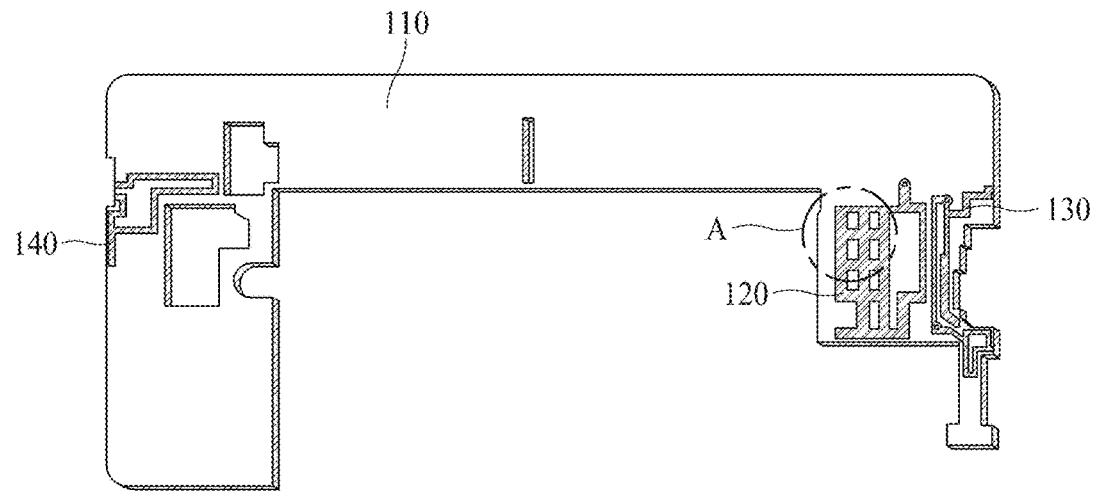
FIG. 2 is a perspective view showing an antenna module according to an embodiment of the present invention.
Figure 3:
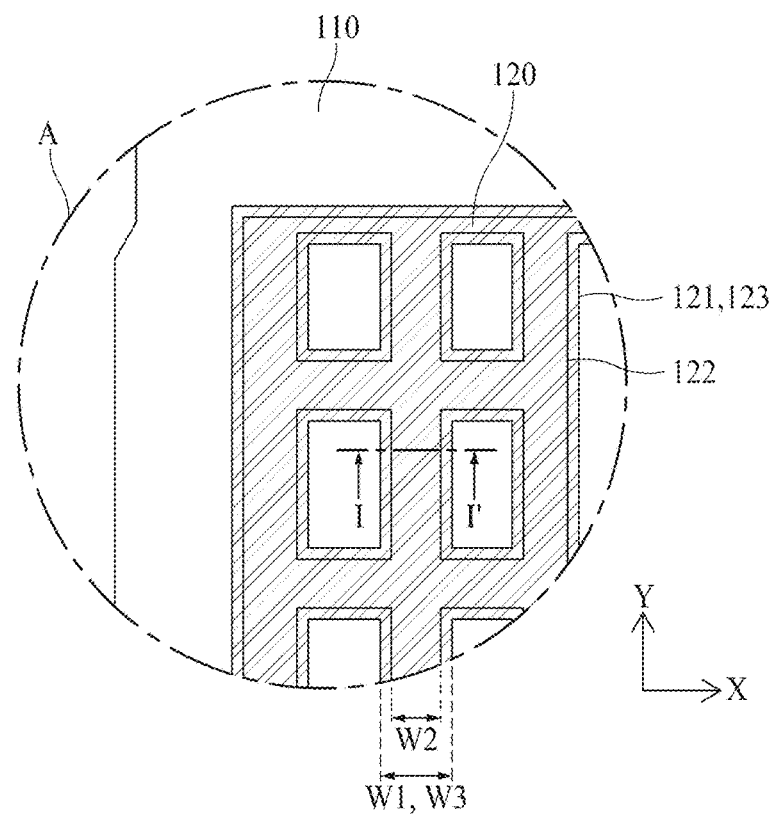
FIG. 3 is an enlarged plan view showing portion "A" of FIG. 2.
Figure 4:
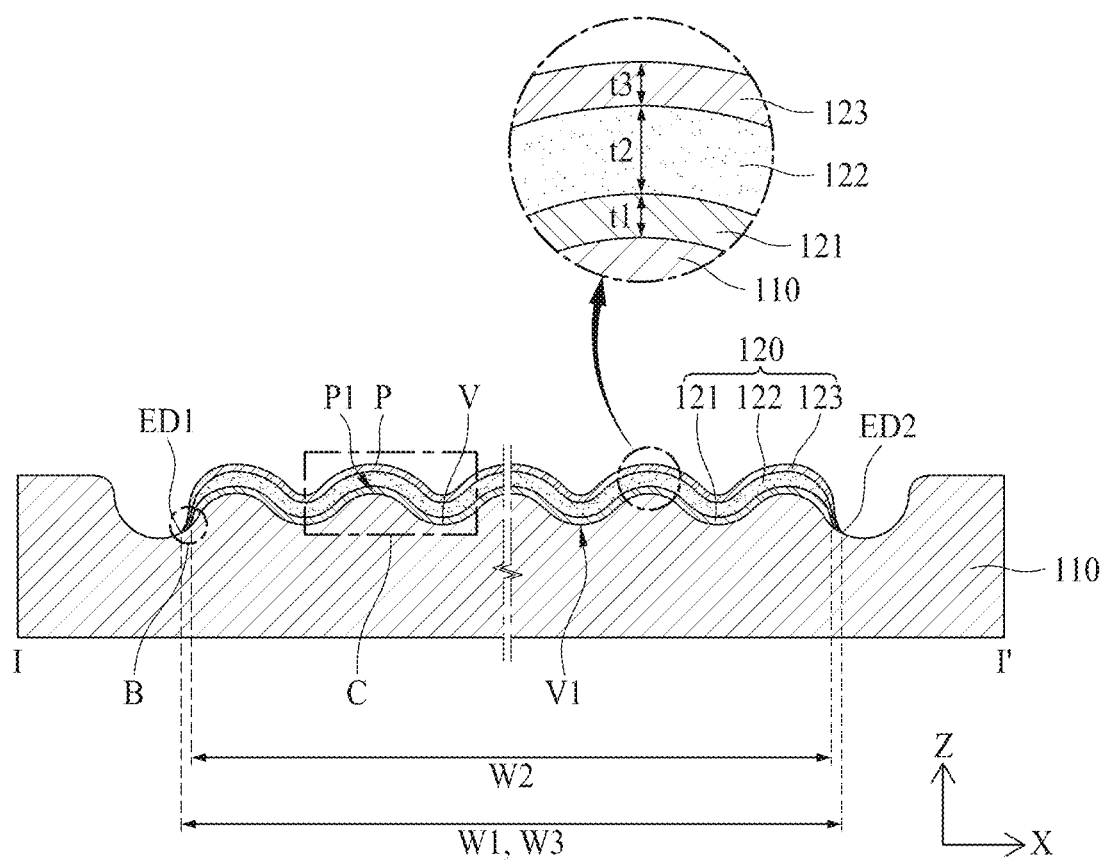
FIG. 4 is a cross-sectional view taken along line I-I' of FIG. 3.

FIG. 2 is a perspective view showing an antenna module 100 according to an embodiment of the present invention. FIG. 3 is an enlarged plan view showing portion "A" of FIG. 2. FIG. 4 is a cross-sectional view taken along line I-I' of FIG. 3.

The antenna module 100 according to the embodiment of the present invention includes a base frame 110 and a conductive pattern 120 disposed on the base frame 110.

The base frame 110 may be made of an insulating material. The base frame 110 may be made of a plastic material in consideration of weight, ease of manufacture, and the like. For example, the base frame 110 may include at least one selected from among polycarbonate (PC), polypropylene (PP), polyimide (PI), polyamide (PA), polyethylene terephthalate (PET), and acrylonitrile-butadiene-styrene (ABS). However, the embodiment of the present invention is not limited thereto, and the base frame 110 may be made of other insulating materials.

The conductive pattern 120 is disposed on the base frame 110.

According to an embodiment of the present invention, the conductive pattern 120 serves as a radiator which transmits and receives radio waves. Therefore, the conductive pattern 120 is also referred to as a radiator.

The antenna module 100 according to the embodiment of the present invention includes at least one conductive pattern 120 disposed on the base frame 110. The antenna module 100 may also include at least two conductive patterns. Referring to FIG. 2, the antenna module 100 includes three conductive patterns 120, 130, and 140. However, the embodiment of the present invention is not limited thereto, and the antenna module 100 may include at least four conductive patterns.

A plurality of conductive patterns 120, 130, and 140 may have different planar shapes according to the functions thereof. For example, the plurality of conductive patterns 120, 130, and 140 may transmit or receive radio waves having different frequencies according to pattern shapes. In addition, according to an embodiment of the present invention, the plurality of conductive patterns 120, 130, and 140 may have the same lamination structure.

Hereinafter, the conductive pattern 120 will be described in more detail with reference to one conductive pattern 120 among the plurality of conductive patterns 120, 130, and 140.

According to an embodiment of the present invention, the surface of the conductive pattern 120 has an areal roughness. A surface of the conductive pattern 120 may have an arithmetical mean height Sa and a maximum height Sz as an areal roughness.

According to an embodiment of the present invention, the surface of the conductive pattern 120 has an areal roughness expressed by an arithmetical mean height Sa ranging from 4.7 μm to 5.7 μm and a maximum height Sz ranging from 40 μm to 55 μm.

Figure 11:
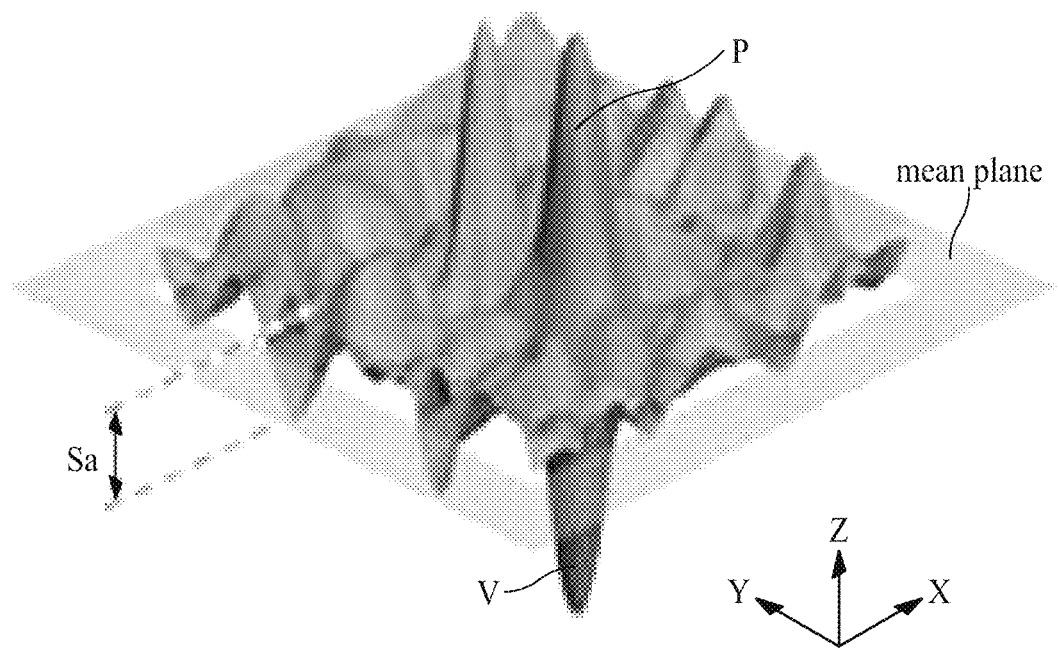
FIG. 11 is a schematic view showing an arithmetical mean height (Sa).

The arithmetical mean height Sa is a three-dimensionally expanded value of Ra which is a two-dimensional surface roughness. FIG. 11 is a schematic view showing the arithmetical mean height Sa.

The arithmetical mean height Sa is measured according to the standard of ISO 25178.

According to an embodiment of the present invention, the arithmetical mean height Sa is a value obtained by dividing an absolute sum of absolute values |Z(x, y)| of heights or depths of respective points of a mean plane by an area of the mean plane. Here, the mean plane is a virtual plane in which the sum of heights of respective points becomes the same as the sum of depths thereof. Thus, the sum of the heights and the sum of the depths are the same with respect to the mean plane. In other words, in a three-dimensional (3D) profile of a measurement region, the sum of volumes (sum of heights) of portions (convex portions P) protruding from a mean plane is the same as the sum of volumes of portions (concave portions V) recessed from the mean plane.

According to an embodiment of the present invention, the arithmetical mean height Sa is obtained by Expression 1 below:

$$Sa = \frac{1}{A} \int \int_A |Z(x, y)| dx dy \quad \text{[Expression 1]}$$

In Expression 1, an area A is an area calculated based on an x-y surface, and a height |Z(x, y)| is measured along a Z-axis.

For example, in a 3D profile of a surface of a measurement target, a concave portion V may be reversed toward a convex portion P, and the sum of the height |Z(x, y)| of respective points with respect to a mean plane may be divided by an area of the measurement target to obtain the arithmetical mean height Sa.

The arithmetical mean height Sa may be measured by a measurement device which performs measurement according to the standard of ISO 25178. According to an embodiment of the present invention, the arithmetical mean height Sa may be measured according to the standard of ISO 25178 by using VK-X1000™ of KEYENCE Corporation, which is a 3D laser scanning microscope.

When the arithmetical mean height Sa of the surface of the conductive pattern 120 is less than 4.7 μm, a surface roughness of an interface between the base frame 110 and the conductive pattern 120 may be low, and thus, adhesion between the base frame 110 and the conductive pattern 120 may be lowered.

Meanwhile, when the arithmetical mean height Sa of the surface of the conductive pattern 120 exceeds 5.7 μm, the interface between the base frame 110 and the conductive pattern 120 is excessively rough, and thus, film stability of the conductive pattern 120 may be lowered, resulting in disconnection, short circuit, or the like.

Therefore, according to an embodiment of the present invention, the surface of the conductive pattern 120 has an arithmetical mean height Sa ranging from 4.7 μm to 5.7 μm.

Figure 12:
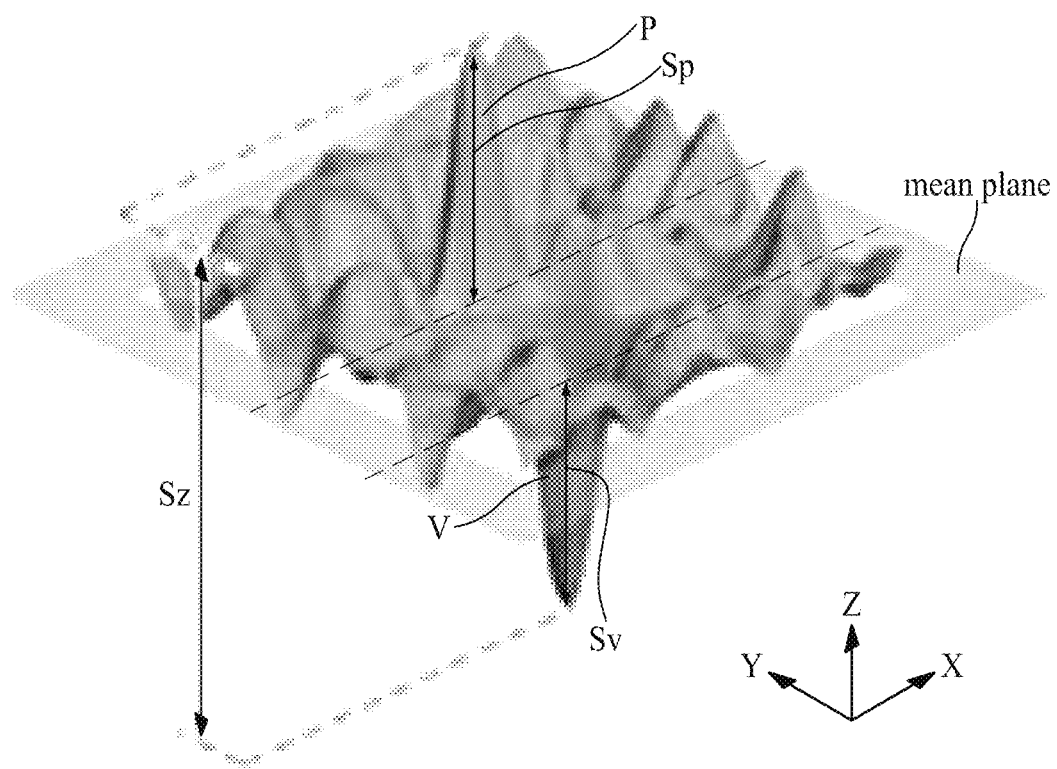
FIG. 12 is a schematic view showing a maximum height (Sz).

The maximum height Sz is the sum of a height (absolute value) of the highest convex portion P and a depth (absolute value) of the deepest concave V in the measurement region. FIG. 12 is a schematic view showing the maximum height Sz. The maximum height Sz is measured according to the standard of ISO 25178.

Referring to FIG. 12, the maximum height Sz is calculated as the sum of the height of the highest convex portion P and the depth of the deepest concave portion V from the mean plane in the measurement region.

Specifically, the maximum height Sz is obtained by Expression 2 below:

$$Sz = |Sp| + |Sv| \quad \text{[Expression 2]}$$

In Expression 2, "Sp" refers to the height of the highest convex portion P, and "Sv" refers to the depth of the deepest concave portion V in the measurement region.

The maximum height Sz may be measured by a measurement device which performs measurement according to the standard of ISO 25178. According to an embodiment of the present invention, the maximum height Sz may be measured according to the standard of ISO 25178 by using VK-X1000™ of KEYENCE Corporation, which is a 3D laser scanning microscope.

When a maximum height Sa of the surface of the conductive pattern 120 is less than 40 μm, a surface roughness of the interface between the base frame 110 and the conductive pattern 120 may be low, and thus, adhesion between the base frame 110 and the conductive pattern 120 may be lowered.

On the other hand, when the maximum height Sz of the surface of the conductive pattern 120 exceeds 55 μm, a height difference between the convex portion P and the concave portion V is large, and an adhesive force and film stability of the conductive pattern 120 may be lowered.

Therefore, according to an embodiment of the present invention, the surface of the conductive pattern 120 has a maximum height Sz ranging from 40 μm to 55 μm.

According to an embodiment of the present invention, the conductive pattern 120 includes at least one conductor layer. Referring to FIG. 4, the conductive pattern 120 includes a first conductor layer 121, a second conductor layer 122 disposed on the first conductor layer 121, and a third conductor layer 123 disposed on the second conductor layer 122.

The first conductor layer 121 may be made of a material having conductivity and high adhesion with the base frame 110. The first conductor layer 121 may include, for example, at least one of among nickel (Ni), molybdenum (Mo), and titanium (Ti). However, the embodiment of the present invention is not limited thereto, and other metals or conductive materials may be used for forming the first conductor layer 121.

According to an embodiment of the present invention, the first conductor layer 121 may be made through nickel (Ni) plating. There is no particular limitation on a nickel (Ni) plating method, and a known nickel (Ni) plating method may be applied. For example, the first conductor layer 121 may be formed through plating using nickel (Ni) and sodium hypophosphite ($NaH_2PO_2$). Nickel sulfate ($NiSO_4 \cdot 6H_2O$), nickel chloride ($NiCl_2 \cdot 6H_2O$), a boric acid ($H_3BO_3$), or the like may be used for forming the first conductor layer 121.

The first conductor layer 121 may serve to improve an adhesive force between the base frame 110 and the conductive pattern 120.

The first conductor layer 121 has a thickness t1 ranging from 0.2 μm to 2 μm. When the thickness t1 of the first conductor layer 121 is less than 0.2 μm, an adhesive force between the base frame 110 and the conductive pattern 120 may not be sufficient. On the other hand, when the thickness t1 of the first conductor layer 121 exceeds 2 μm, the conductive pattern 120 may become thicker than necessary, which may be disadvantageous for thinning and may cause peeling of the conductive pattern 120. More specifically, the first conductor layer 121 may have the thickness t1 ranging from 0.5 μm to 1 μm.

The second conductor layer 122 may be made of a material having high conductivity. The second conductor layer 122 may include, for example, at least one of copper (Cu) and aluminum (Al). However, the embodiment of the present invention is not limited thereto, and other metals or conductive materials may be used for forming the second conductor layer 122.

According to an embodiment of the present invention, the second conductor layer 122 may be formed through copper (Cu) plating. There is no particular limitation on a copper (Cu) plating method, and a known copper (Cu) plating method may be applied. For example, for the copper (Cu) plating, sodium (NaOH), formaldehyde (HCHO), and the like may be used together with copper (Cu).

The second conductor layer 122 serves as a main conductor which transmits and receives radio waves.

The second conductor layer 122 has a thickness t2 ranging from 8 µm to 17 µm. When the thickness t2 of the second conductor layer 122 is less than 8 µm, electrical conductivity of the conductive pattern 120 may not be sufficient. On the other hand, when the thickness t2 of the second conductor layer 122 exceeds 17 µm, the conductive pattern 120 becomes thicker than necessary, which is disadvantageous for thinning. More specifically, the second conductor layer 122 may have the thickness t2 ranging from 9 µm to 15 µm.

The third conductor layer 123 may be made of a material having conductivity and high resistance to corrosion or degeneration. The third conductor layer 123 may include, for example, at least one of among nickel (Ni), molybdenum (Mo), and titanium (Ti). However, the embodiment of the present invention is not limited thereto, and other metals or conductive materials may be used for forming the third conductor layer 123.

According to an embodiment of the present invention, the third conductor layer 123 may be made through nickel (Ni) plating. There is no particular limitation on a nickel (Ni) plating method, and a known nickel (Ni) plating method may be applied. For example, the third conductor layer 123 may be formed through plating using nickel (Ni) and sodium hypophosphite ($NaH_2PO_2$). In addition, nickel sulfate ($NiSO_4 \cdot 6H_2O$), nickel chloride ($NiCl_2 \cdot 6H_2O$), a boric acid ($H_3BO_3$), or the like may be used for forming the third conductor layer 123.

The third conductor layer 123 serves to protect the second conductor layer 122 and the conductive pattern 120.

The third conductor layer 123 may have a thickness t3 ranging from 1 µm to 7 µm. When the thickness t3 of the third conductor layer 123 is less than 1 µm, the second conductor layer 122 may not be sufficiently protected. On the other hand, when the thickness t3 of the third conductor layer 123 exceeds 7 µm, the conductive pattern 120 becomes thicker than necessary, which is disadvantageous for thinning.

Referring to FIG. 5, the first conductor layer 121 and the third conductor layer 123 may be in contact with each other at an edge of the conductive pattern 120.

Figure 5A:
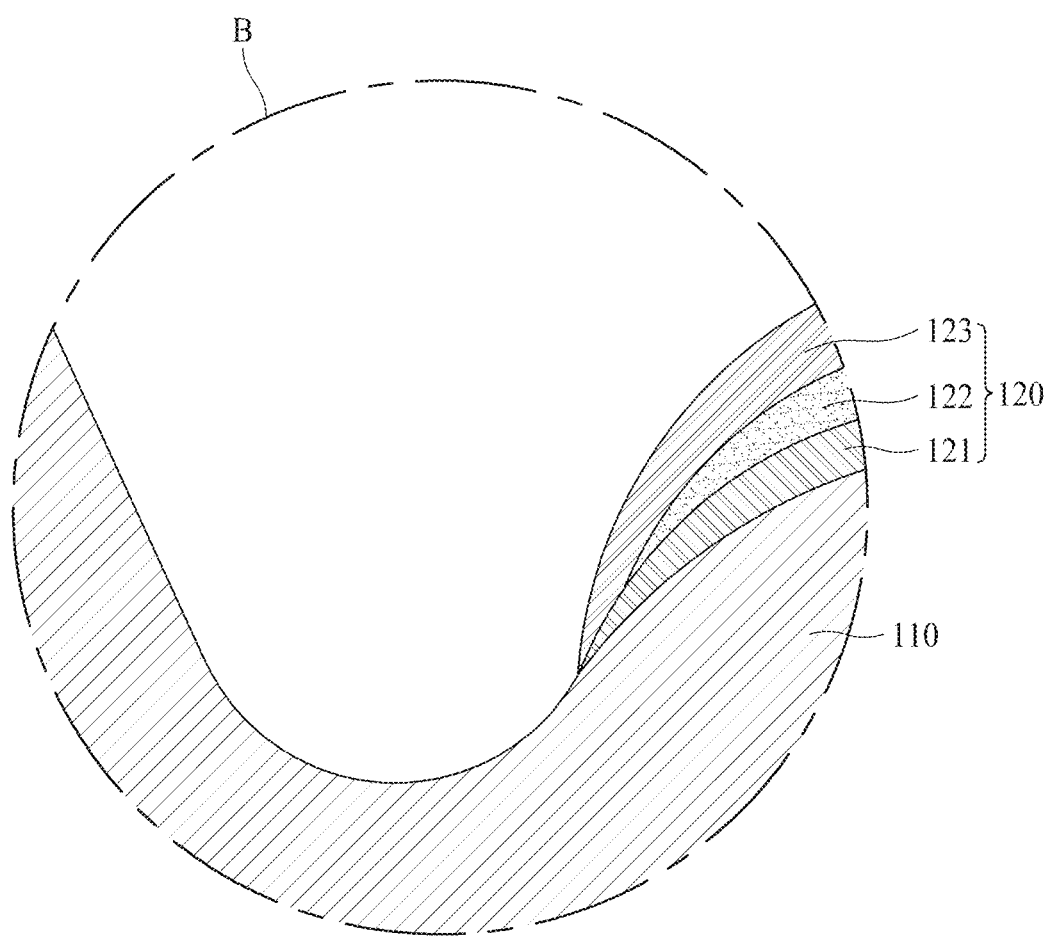
FIGS. 5A and 5B are enlarged views showing portion "B" of FIG. 4.
Figure 5B:
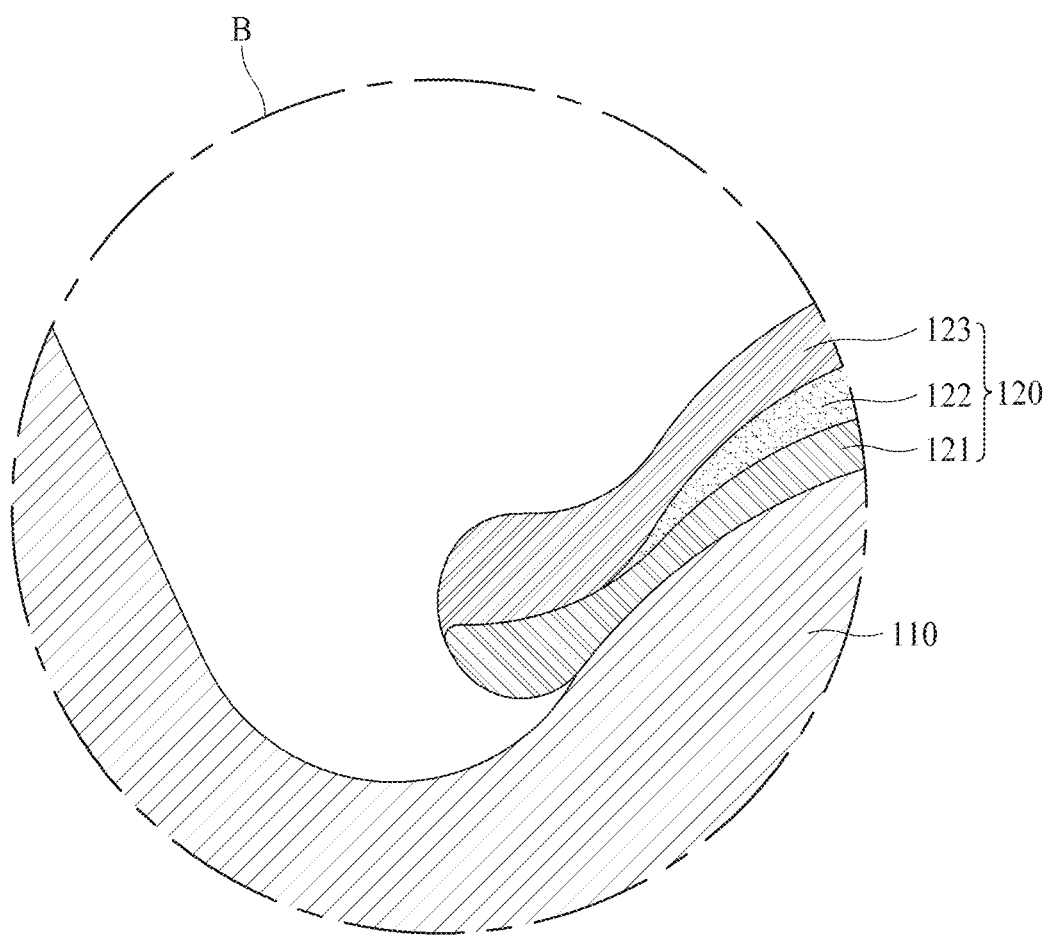

FIGS. 5A and 5B are enlarged views showing portion "B" of FIG. 4.

Referring to FIGS. 5A and 5B, the first conductor layer 121 and the third conductor layer 123 may be in contact with each other at the edge of the conductive pattern 120 to form a closed space, and the second conductor layer 122 may be disposed in the closed space formed by the first conductor layer 121 and the third conductor layer 123. Therefore, the second conductor layer 122 may be efficiently protected.

According to an embodiment of the present invention, the second conductor layer 122 is disposed on the first conductor layer 121 in a region excluding an edge of the first conductor layer 121. The third conductor layer 123 is in contact with the first conductor layer 121 at the edge of the first conductor layer. As a result, the second conductor layer 122 may be disposed in the closed space formed by the first conductor layer 121 and the third conductor layer 123.

Specifically, when the first conductor layer 121 and the third conductor layer 123 are in contact with each other at the edge of the conductive pattern 120, an interaction may occur between the first conductor layer 121 and the third conductor layer 123. Therefore, contact between the first conductor layer 121 and the third conductor layer 123 may become strong, and a volume or thickness of the edge of the conductive pattern 120, which is formed due to the contact between the first conductor layer 121 and the third conductor layer 123, may be increased.

For example, referring to FIG. 5B, the thickness of the edge of the conductive pattern 120, at which the first conductor layer 121 and the third conductor layer 123 are in contact with each other, may be greater than a thickness of each of the first conductor layer and the third conductor layer 123 disposed at portions excluding the edge of the conductive pattern.

As a result, the second conductor layer 122 may be stably protected in the closed space formed by the first conductor layer 121 and the third conductor layer 123.

According to an embodiment of the present invention, a thickness may be determined by measuring a distance between any one surface and a corresponding surface opposite to the one surface and, for example, may be measured in a Z-axis direction. Referring to FIG. 4, the first conductor layer 121, the second conductor layer 122, and the third conductor layer 123 may have the thickness t1, the thickness t2, and the thickness t3 in a Y-axis direction, respectively.

Referring to FIGS. 3, 4, and 5, the second conductor layer 122 has a smaller area than the first conductor layer 121 in a plan view, is disposed within a region of the first conductor layer 121, and is not disposed at the edge of the first conductor layer 121. The third conductor layer 123 may have a larger area than the second conductor layer 122 in a plan view and may be in contact with the first conductor layer 121 at the edge of the first conductor layer. The third conductor layer 123 may have substantially the same area as the first conductor layer 121. Here, a plane is, for example, an X-Y plane.

Referring to FIGS. 3 and 4, a width w1 of the first conductor layer 121 and a width w3 of the third conductor layer 123 are greater than a width w2 of the second conductor layer 122. According to an embodiment of the present invention, a width may be determined by measuring a distance across a surface of each layer on the X-Y plane.

Referring to FIG. 3, although a width is measured in any direction on the X-Y plane, the width of the first conductor layer 121 and the width of the third conductor layer 123 may be greater than the width of the second conductor layer 122.

In addition, according to an embodiment of the present invention, the width w1 of the first conductor layer 121 and the width w3 of the third conductor layer 123 may be greater than the width w2 of the second conductor layer 122 between one end ED1 at which the first conductor layer 121 and the third conductor layer 123 are in contact with each other and the other end ED2 at which the first conductor layer 121 and the third conductor layer 123 are in contact with each other in any one direction in a plan view. Here, a plane is the X-Y plane. According to an embodiment of the present invention, the first conductor layer 121 and the third conductor layer 123 may have substantially the same width (w1=w3).

The conductive pattern 120 may further include a seed layer 124. According to an embodiment of the present invention, the conductive pattern 120 may further include the seed layer 124 disposed between the base frame 110 and the first conductor layer 121 (see FIG. 7).

The seed layer 124 improves an adhesive force between the base frame 110 and the conductive pattern 120. The seed layer 124 is made of a material having a strong adhesive force with respect to both of an insulator, such as plastic, constituting the base frame 110 and the first conductor layer 121, which is the lowermost layer of the conductive pattern 120. Accordingly, the base frame 110 and the first conductor layer 121 may be strongly coupled through the seed layer 124 so that the conductive pattern 120 may be stably attached to the base frame 110.

Any material may be used as a material for forming the seed layer 124 without limitation as long as the material has a strong adhesive force with respect to a metal and plastic. According to an embodiment of the present invention, the seed layer 124 includes, for example, at least one of palladium (Pd) and tin (Sn).

According to an embodiment of the present invention, the seed layer 124 may be formed by immersing the base frame 110 in a hydrochloric acid (HCl) solution in which palladium chloride ($PdCl_2$) is dissolved. Alternatively, the seed layer 124 may be formed by immersing the base frame 110 in a sodium hydroxide (NaOH) solution in which tin chloride ($SnCl_2$) is dissolved.

Referring to FIG. 4, the base frame 110 includes an uneven portion having hills P1 and valleys V1, and the conductive pattern 120 is disposed on the uneven portion. More specifically, the uneven portion is formed in a partial region of the base frame 110, and the conductive pattern 120 is formed in a region in which the uneven portion is formed among regions of the base frame 110.

The conductive pattern 120 has a surface shape substantially the same as a surface shape of the base frame 110. For example, the conductive pattern 120 may have the same surface shape as the uneven portion in a cross-sectional view. More specifically, the conductive pattern 120 may have the same surface shape as the base frame 110 at the uneven portion with respect to in the cross-sectional view.

Specifically, the base frame 110 has a surface profile, and the conductive pattern 120 formed on the base frame 110 has a surface profile substantially the same as that of the base frame 110. Since the conductive pattern 120 is formed as a thin film, the surface profile of the base frame 110 is reflected in the conductive pattern 120.

Therefore, the convex portion P of the conductive pattern 120 is formed on the hill P1 of the base frame 110, and the concave portion V of the conductive pattern 120 is formed on the valley V1 of the base frame 110. As a result, the conductive pattern 120 may have the same surface profile as the uneven portion in the cross-sectional view.

Since the base frame 110 includes the uneven surface having the hills P1 and the valleys V1, when the conductive pattern 120 is formed through plating or the like, the conductive pattern 120 may be easily attached to the base frame 110. As a result, an adhesive force of the conductive pattern 120 is improved.

According to an embodiment of the present invention, an average of three to seven hills P1 and an average of three to seven valleys V1 per a length of 500 μm are formed in the base frame 110 in any one direction thereof. For example, the uneven portion may have an average of three to seven hills P1 and an average of three to seven valleys V1 per a length of 500 μm in any one direction. Accordingly, the conductive pattern 120 also includes three to seven convex portions P and three to seven concave portions V per a length of 500 μm in any one direction.

When each of the number of the hills P1 and the number of the valleys V1 per a length of 500 μm in any one direction of the base frame 110 is less than three, a surface roughness of the base frame 110 may be low, and thus, an adhesive force of the conductive pattern 120 may be lowered.

On the other hand, when each of the number of the hills P1 and the number of the valleys V1 per a length of 500 μm in any one direction of the base frame 110 exceeds seven, a surface of the base frame 110 may be excessively rough, and thus, film stability of the conductive pattern 120 may be lowered.

Figure 6:
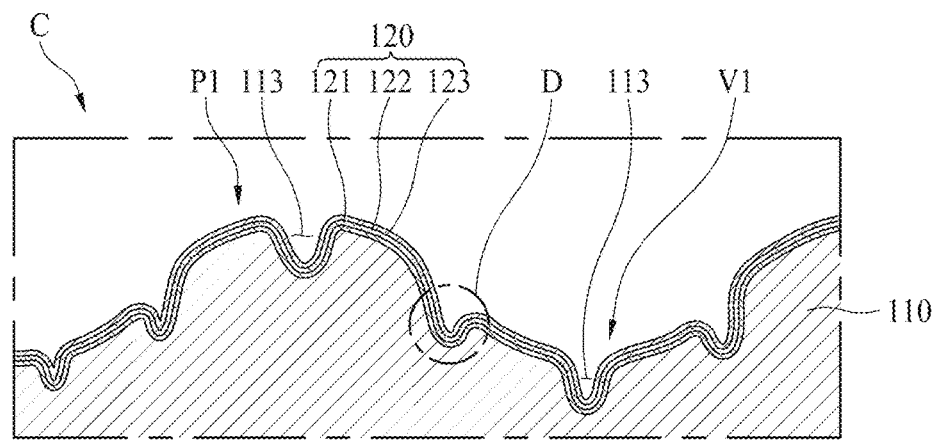
FIG. 6 is an enlarged view showing portion "C" of FIG. 4.

Referring to FIG. 6, the base frame 110 has holes P1 formed in surfaces of the hill P1 and the valley V1 of the uneven portion.

FIG. 6 is an enlarged view showing portion "C" of FIG. 4. FIG. 6 shows the holes 113 formed along the surfaces of the hill P1 and the valley V1 of the uneven portion. For example, the holes 113 may be formed during surface treatment using laser irradiation after the base frame 110 is formed. In this case, the holes 113 may be formed by a laser in the form of a point light source. The hole 113 as formed above corresponds to a laser-irradiated portion.

Due to the presence of the hole 113, a micro roughness of the base frame 110 may be increased so that an adhesive force between the base frame 110 and the conductive pattern 120 may be improved.

For example, the hole 113 may have a depth ranging from 3 μm to 30 μm. When the depth of the hole 113 is less than 3 μm, a degree of an increase in micro roughness of the base frame 110 is insignificant, and an adhesive force between the base frame 110 and the conductive pattern 120 is scarcely improved.

On the other hand, when the depth of the hole 113 exceeds 30 μm, due to the excessive depth of the hole 113, the first conductor layer constituting the conductive pattern 120 may not be formed to extend to a bottom of the hole 113, resulting in a reduction in adhesive force between the base frame 110 and the conductive pattern 120.

Figure 7:
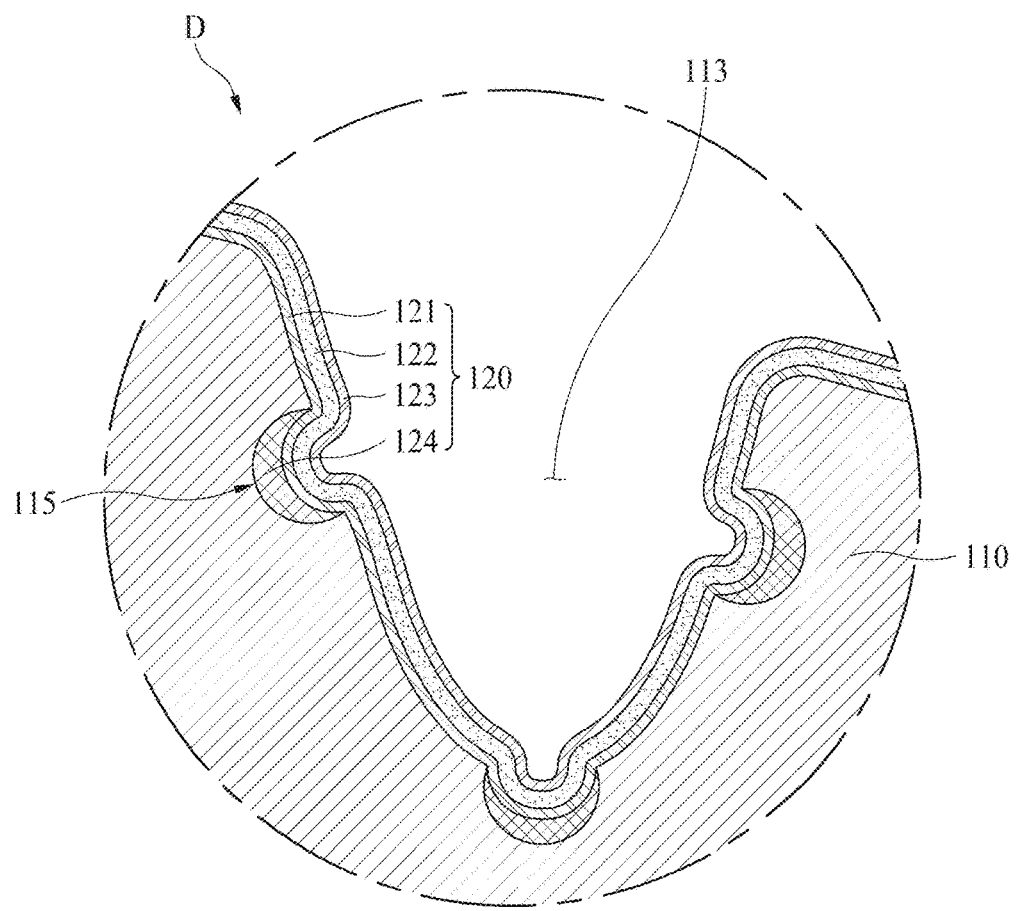
FIG. 7 is an enlarged view showing portion "D" of FIG. 6.

FIG. 7 is an enlarged view showing portion "D" of FIG. 6.

Referring to FIG. 7, the base frame 110 has pores 115 formed in a surface of the hole 113. Components constituting the base frame 110 are decomposed or degraded during a process of irradiating a laser on the base frame 110. In a process of post-treating or cleaning the base frame 110, the decomposed or degraded components may be removed to form the pore 115.

The pore may have a depth ranging from 0.3 μm to 30 μm. A micro roughness of the base frame 110 may be increased by the pore 115, and thus, an adhesive force between the base frame 110 and the conductive pattern 120 may be improved.

In addition, the seed layer 124 may be disposed in the pore 115.

Referring to FIG. 7, the conductive pattern 120 further includes the seed layer 124 disposed in the pore 115. As shown in FIG. 7, the seed layer 124 disposed in the fine pores 115 is not easily peeled off of the base frame 110. As a result, the base frame 110 and the conductive pattern 120 are not easily separated from each other, and thus, an adhesive force between the base frame 110 and the conductive pattern 120 is improved. Therefore, stability of the conductive pattern 120 is improved, whereby stability of the antenna module 100 is improved. The antenna module 100 has high reliability, and a defect rate thereof is reduced.

Figure 8A:
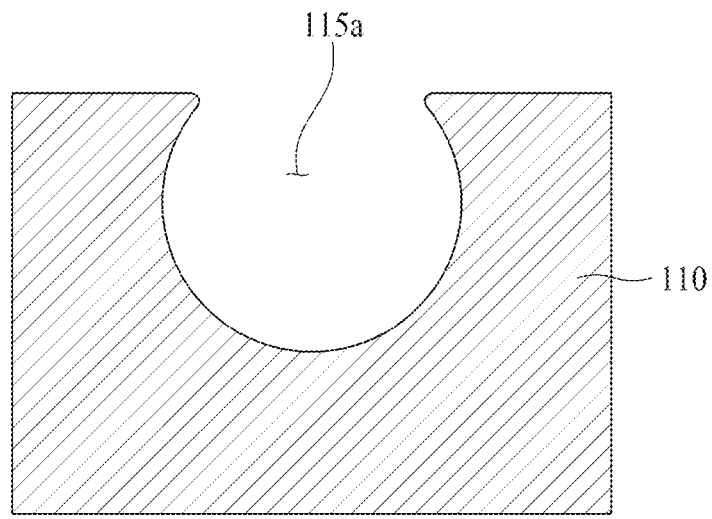
FIGS. 8A and 8B are schematic views showing shapes of pores.
Figure 8B:
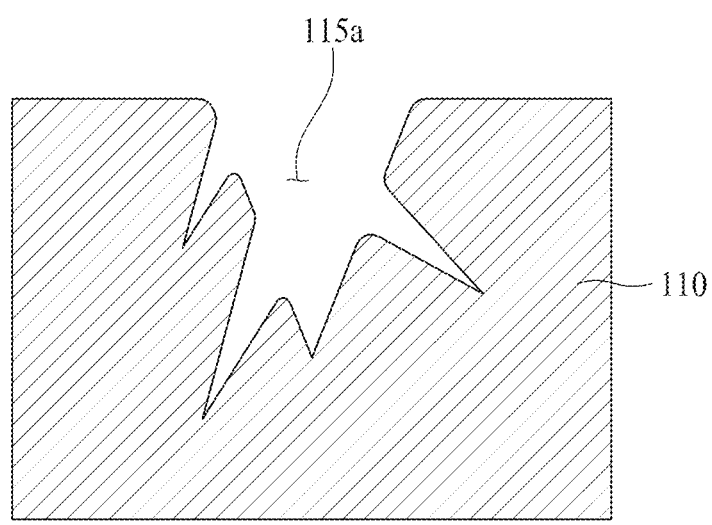

FIGS. 8A and 8B are schematic views showing shapes 115a and 115b of the pores 115. There is no particular limitation on the shapes 115a and 115b of the pores 115. In addition to the shapes 115a and 115b shown in FIGS. 8A and 8B, the pores 115 having various other shapes may be formed although all the shapes may not be shown in the drawings.

Figure 9:
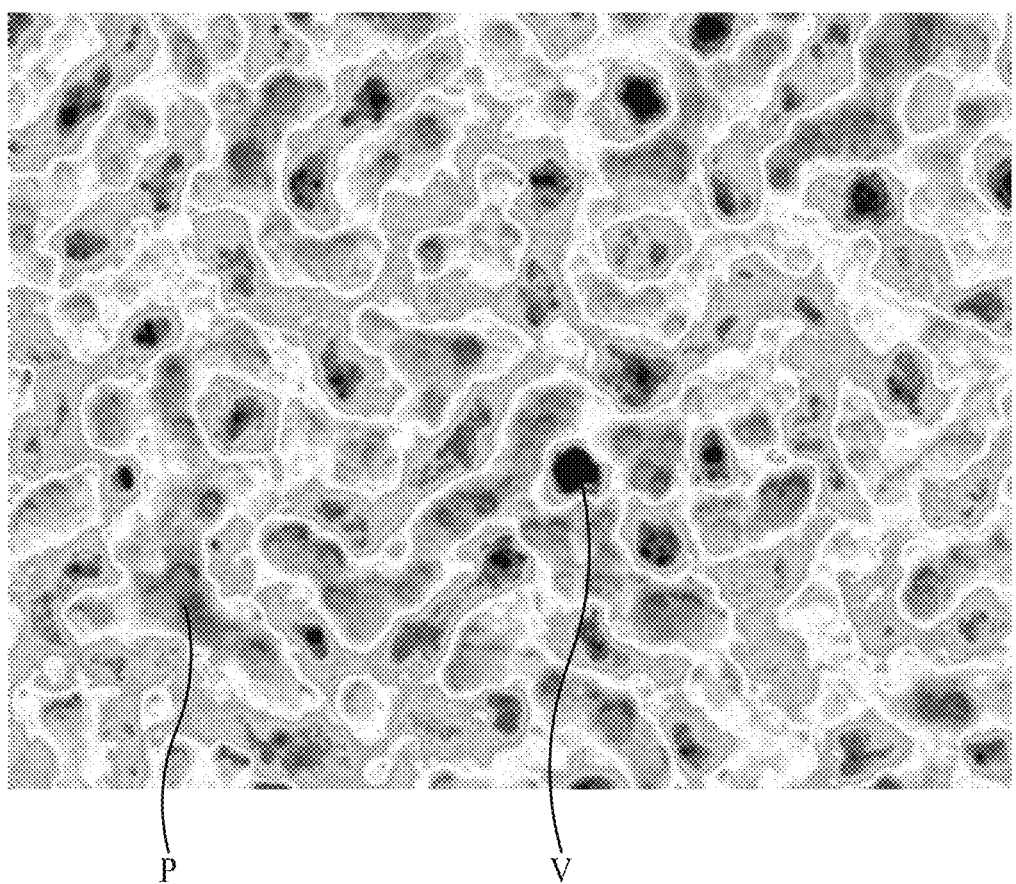
FIG. 9 is an image of a surface of a conductive pattern according to the embodiment of the present invention.
Figure 10:
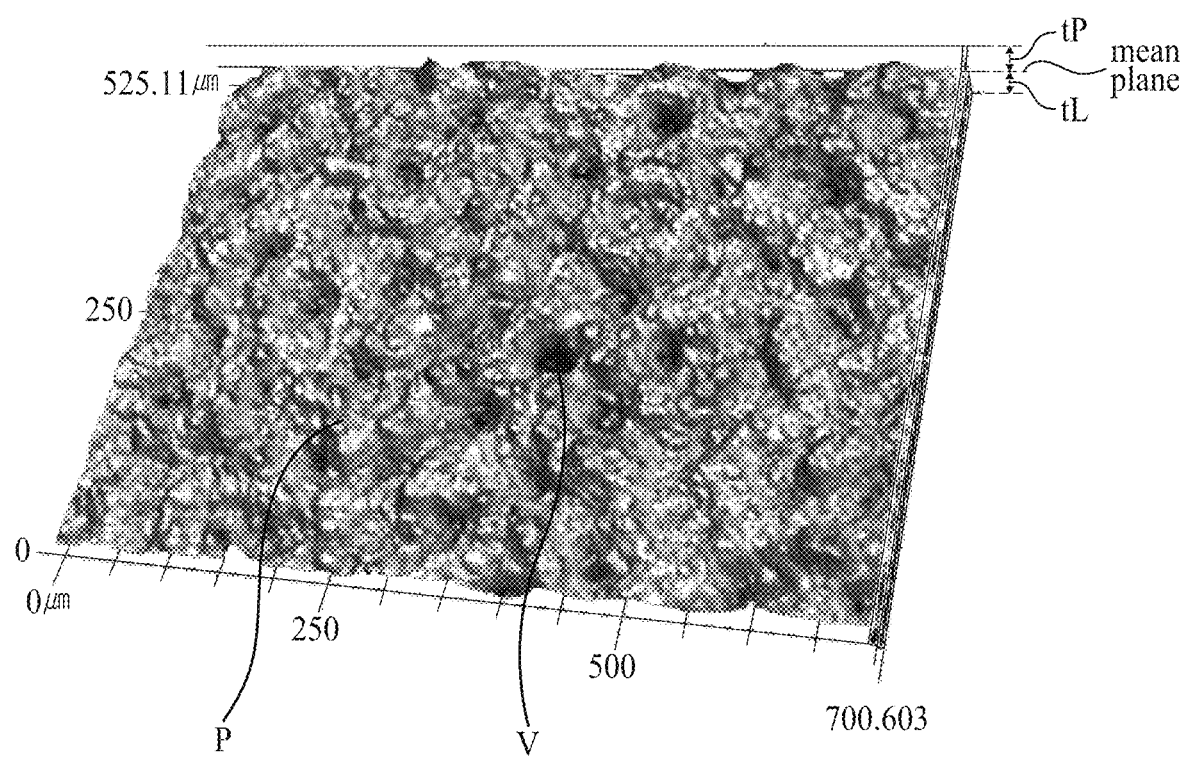
FIG. 10 is a three-dimensional image of the surface of the conductive pattern according to the embodiment of the present invention.

FIG. 9 is an image of the surface of the conductive pattern 120 according to the embodiment of the present invention, and FIG. 10 is a 3D image of the surface of the conductive pattern 120 according to the embodiment of the present invention.

The surface of the conductive pattern 120 according to the embodiment of the present invention shown in FIG. 9 has the areal roughness expressed by the arithmetical mean height Sa ranging from 4.7 μm to 5.7 μm and the maximum height Sz ranging from 40 μm to 55 μm.

The surface of the conductive pattern 120 according to the embodiment of the present invention shown in FIG. 9 includes three to seven convex portions P and three to seven concave portions V per a length of 500 μm in any one direction.

In addition, referring to FIG. 10, the conductive pattern 120 has a maximum height tP of the convex portion and a maximum depth tL of the concave portion with respect to the mean plane.

The conductive pattern 120 having such a surface shape is used as a radiator for transmitting, receiving, or transmitting/receiving radio waves.

The antenna module 100 according to the embodiment of the present invention may be applied to various terminals which transmit and receive radio waves, and particularly, to portable terminals such as mobile phones, tablet personnel computers (PCs), and notebook computers.

Another embodiment of the present invention provides an antenna module including a base frame 110 and a radiator disposed on the base frame 110.

According to another embodiment of the present invention, the radiator includes a first conductor layer 121, a second conductor layer 122 disposed on the first conductor layer 121, and a third conductor layer 123 disposed on the second conductor layer 122. In addition, a surface of the radiator has an areal roughness expressed by an arithmetical mean height Sa ranging from 4.7 μm to 5.7 μm and a maximum height Sz ranging from 40 μm to 55 μm.

The radiator according to another embodiment of the present invention may have the same structure as the conductive pattern 120 shown in FIGS. 2 to 7. For example, the first conductor layer 121 and the third conductor layer 123 may be in contact with each other at an edge of the radiator. Specifically, the first conductor layer 121 and the third conductor layer 123 may be in contact with each other at the edge of the conductive pattern 120 to form a closed space, and the second conductor layer 122 may be disposed in the closed space formed by the first conductor layer 121 and the third conductor layer 123.

Another embodiment of the present invention provides an antenna module including a base frame 110 having a radiator region and a radiator disposed in the radiator region. The radiator according to another embodiment of the present invention corresponds to the conductive pattern 120 shown in FIGS. 2 to 7, and the radiator region corresponds to a region of the base frame 110, in which the conductive pattern 120 is formed.

Specifically, in FIG. 2, a region of the base frame 110 in which the conductive pattern 120 is formed corresponds to the radiator region.

An uneven portion having a hill P1 and a valley V1 is formed in the radiator region, and holes 133 are formed in surfaces of the hill P1 and the valley V1 of the uneven portion.

The radiator includes a first conductor layer 121, a second conductor layer 122 on the first conductor layer 121, and a third conductor layer 123 on the second conductor layer 122. In addition, a pore 115 is formed in a surface of the hole 113.

The radiator further includes a seed layer 124 which is disposed in the pore 115 and is in contact with the first conductor layer 121.

Figure 13:
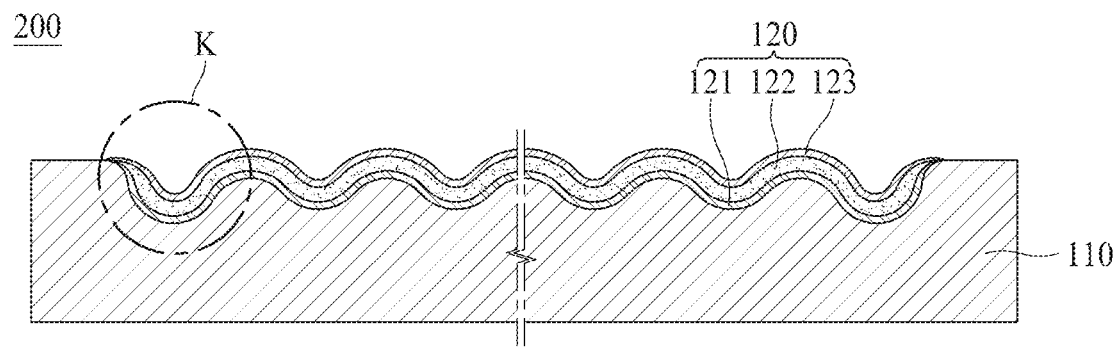
FIG. 13 is a cross-sectional view showing an antenna module according to another embodiment of the present invention.
Figure 14:
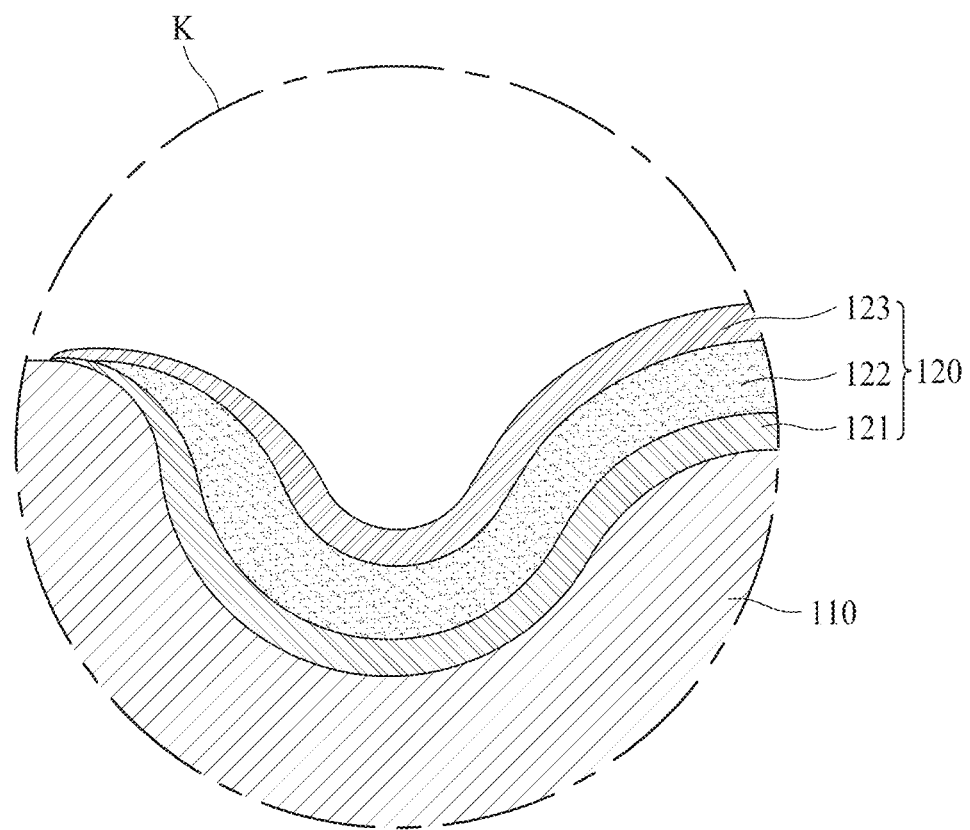
FIG. 14 is an enlarged view showing portion "K" of FIG. 13.

FIG. 13 is a cross-sectional view showing an antenna module 200 according to another embodiment of the present invention, and FIG. 14 is an enlarged view showing portion "K" of FIG. 13.

The antenna module 200 according to another embodiment of the present invention includes a base frame 110 and a conductive pattern 120 disposed on the base frame 110.

According to another embodiment, the conductive pattern 120 includes a first conductor layer 121, a second conductor layer 122 disposed on the first conductor layer 121, and a third conductor layer 123 disposed on the second conductor layer 122.

According to another embodiment, the first conductor layer 121 and the third conductor layer 123 may be in contact with each other at an edge of the conductive pattern 120. Referring to FIG. 14, the first conductor layer 121 and the third conductor layer 123 may be in contact with each other at the edge of the conductive pattern 120 to form a closed space, and the second conductor layer 122 may be disposed in the closed space formed by the first conductor layer 121 and the third conductor layer 123. Therefore, the second conductor layer 122 may be efficiently protected.

Referring to FIG. 13, the base frame 110 includes an uneven portion having hills P1 and valleys V1, and the conductive pattern 120 is disposed on the uneven portion. The conductive pattern 120 has a surface shape substantially the same as a surface shape of the base frame 110. For example, the conductive pattern 120 may have the same surface shape as the uneven portion in a cross-sectional view. More specifically, the conductive pattern 120 may have the same surface shape as the base frame 110 at the uneven portion in the cross-sectional view. In addition, the base frame 110 has a surface profile, and the conductive pattern 120 formed on the base frame 110 has a surface profile substantially the same as that of the base frame 110.

Referring to FIG. 13, the conductive pattern 120 has the same planar area and planar shape as the uneven portion of the base frame 110.

The conductive pattern 120 of FIG. 13 serves as a radiator which transmits and receives radio waves. The conductive pattern 120 is also referred to as a radiator. Therefore, according to still another embodiment, a radiator is provided including a first conductor layer 121, a second conductor layer 122 disposed on the first conductor layer 121, and a third conductor layer 123 disposed on the second conductor layer 122.

According to yet another embodiment, the first conductor layer 121 and the third conductor layer 123 may be in contact with each other at an edge of the radiator. The first conductor layer 121 and the third conductor layer 123 may be in contact with each other at the edge of the conductive pattern 120 to form a closed space at the edge of the radiator, and the second conductor layer 122 may be disposed in the closed space formed by the first conductor layer 121 and the third conductor layer 123.

According to yet another embodiment of the present invention, an electronic device is provided including the above-described antenna module. An electronic device according to an embodiment of the present invention includes an antenna module 100 including a base frame 110 and a conductive pattern 120 disposed on the base frame 110.

Specifically, the electronic device according to the embodiment of the present invention includes the antenna module including the base frame 110 and the conductive pattern 120 disposed on the base frame 110, wherein the conductive pattern 120 includes a first conductor layer 121, a second conductor layer 122 disposed on the first conductor layer 121, and a third conductor layer 123 disposed on the second conductor layer 122, and a surface of the conductive pattern 120 has an areal roughness expressed by an arithmetical mean height Sa ranging from 4.7 μm to 5.7 μm and a maximum height Sz ranging from 40 μm to 55 μm.

Descriptions of the above-described components will be omitted below to avoid repetition.

The electronic device according to yet another embodiment of the present invention is a device capable of transmitting and receiving radio waves. Examples of the electronic device include a mobile phone, a notebook, a radio set, a tablet PC, a smartphone, and the like. The antenna module may be embedded in or externally mounted on electronic devices, such as the mobile phone, the notebook, the radio set, the tablet PC, and the smartphone. In the present specification, detailed descriptions of specific configurations of the electronic devices, such as the mobile phone, the notebook, the radio set, the tablet PC, and the smartphone, will be omitted.

Hereinafter, a method of manufacturing an antenna module 100 will be described with reference to FIGS. 15A to 15I. For convenience of description, the method of manufacturing the antenna module 100 according to the embodiment of the present invention will be described on the basis of one conductive pattern 120 disposed on the base frame 110 of FIG. 2.

FIGS. 15A to 15I are views showing a process of manufacturing the antenna module 100 according to the embodiment of the present invention. Specifically, FIGS. 15A to 15I are views showing the process of manufacturing the antenna module 100 shown in FIG. 2.

The method of manufacturing the antenna module 100 according to the embodiment of the present invention includes manufacturing a base frame 110 including an uneven portion 120a with hills P1 and valleys V1, forming a plurality of holes 113 in a surface of the uneven portion 120a, forming pores 115 in a surface of the hole 113, and forming a conductive pattern 120 on the uneven portion 120a.

The forming of the conductive pattern 120 may include forming a first conductor layer 121 on the uneven portion 120a, forming a second conductor layer 122 on the first conductor layer 121, and forming a third conductor layer 123 on the second conductor layer 122.

The conductive pattern 120 may have the same surface shape as the uneven portion 120a in a cross-sectional view. More specifically, the conductive pattern 120 may have the same surface profile as the uneven portion.

In addition, the conductive pattern 120 may have the same planar shape as the uneven portion 120a. More specifically, the conductive pattern 120 may have the same planar pattern shape as the uneven portion 120a.

Figure 15A:
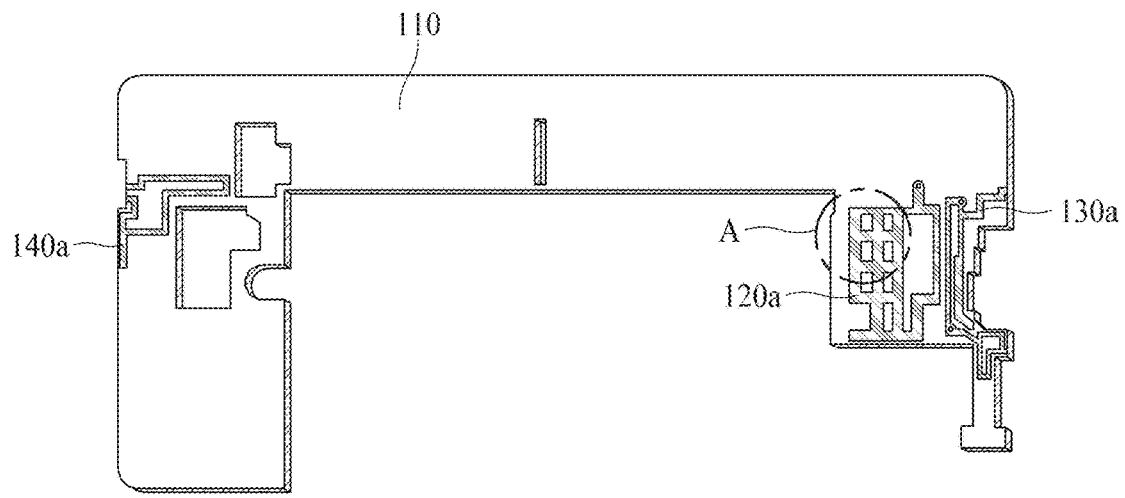
FIGS. 15A to 15I are views showing a process of manufacturing an antenna module according to an embodiment of the present invention.
Figure 15B:
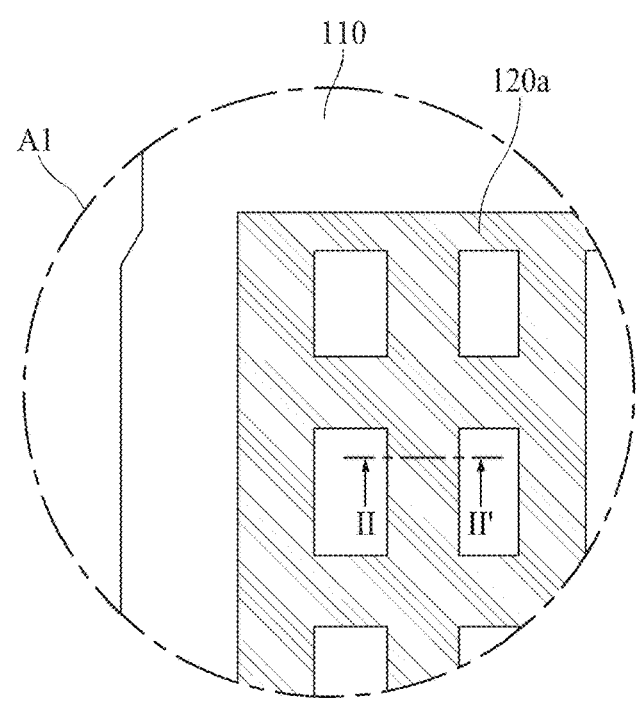
Figure 15C:
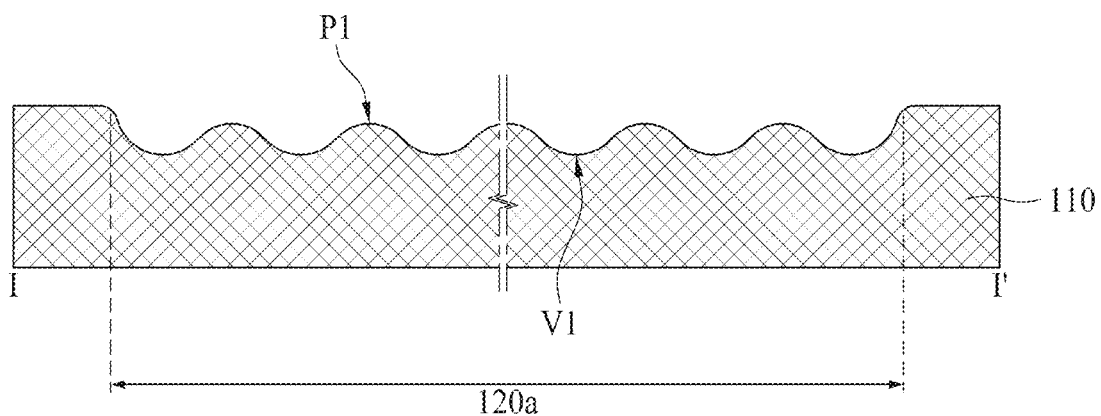

Referring to FIGS. 15A to 15C, first, the base frame 110 including the uneven portion 120a with the hills P1 and the valleys V1 is manufactured. FIG. 15A is a perspective view showing the base frame 110 in which the uneven portion 120a is formed. FIG. 15B is an enlarged view showing portion "A" of FIG. 15A. FIG. 15C is a cross-sectional view taken along line II-IF of FIG. 15B.

Referring to FIG. 15A, the base frame 110 includes at least one uneven portion 120a. The base frame 110 may include at least two uneven portions 120a. Referring to FIG. 15A, the base frame 110 includes three uneven portions 120a, 130a, and 140a. However, the embodiment of the present invention is not limited thereto, and the base frame 110 may have at least four uneven portions.

A plurality of uneven portions 120a, 130a, and 140a may have different planar shapes according to the functions or types of a plurality of conductive patterns 120, 130, and 140 formed thereon. Hereinafter, for convenience of description, the method of manufacturing the antenna module 100 will be described on the basis of one uneven portion 120a among the plurality of uneven portions 120a, 130a, and 140a.

The base frame 110 is made of an insulating material. The base frame 110 may be made of a plastic material in consideration of weight, ease of manufacture, and the like. The base frame 110 may be formed by injecting an insulating plastic material.

More specifically, the base frame 110 may be formed by injection using a mold (not shown). The mold may have an engraved pattern and an embossed pattern respectively corresponding to the hill P1 and the valley V1 of the uneven portion 120a. By injecting the insulating plastic material using the mold, the base frame 110 including the uneven portion 120a with the hill P1 and the valley V1 may be manufactured.

There is no particular limitation on the plastic material used for forming the base frame 110. For example, at least one selected from among PC, PP, PI, PA, PET, and ABS may be used to form the base frame 110. According to an embodiment of the present invention, the base frame 110 may be made of a mixture of PC and ABS. Furthermore, the frame 110 may have a structure in which a glass fiber (GF) is dispersed in PC. However, the embodiment of the present invention is not limited thereto, and the base frame 110 may be made of other insulating materials.

The base frame 110 may have a dielectric constant of 5 to 15.

According to an embodiment of the present invention, an average of three to seven hills P1 and an average of three to seven valleys V1 per a length of 500 μm are formed in the uneven portion 120a in any one direction thereof. Accordingly, the conductive pattern 120 may include three to seven convex portions P and three to seven concave portions V per a length of 500 μm in any one direction (see FIGS. 9 and 15C).

When each of the number of the hills P1 and the number of the valleys V1 per a length of 500 μm in any one direction of the uneven portion 120a is less than three, a surface roughness of the uneven portion 120a may be low, and thus, adhesion between the conductive pattern 120 formed on the uneven portion 120a and the base frame 110 may be lowered.

On the other hand, when each of the number of the hills P1 and the number of the valleys V1 per a length of 500 μm in any one direction of the base frame 110 exceeds seven, a surface of the uneven portion 120a may be excessively rough, and thus, film stability of the conductive pattern 120 may be lowered.

Figure 15D:
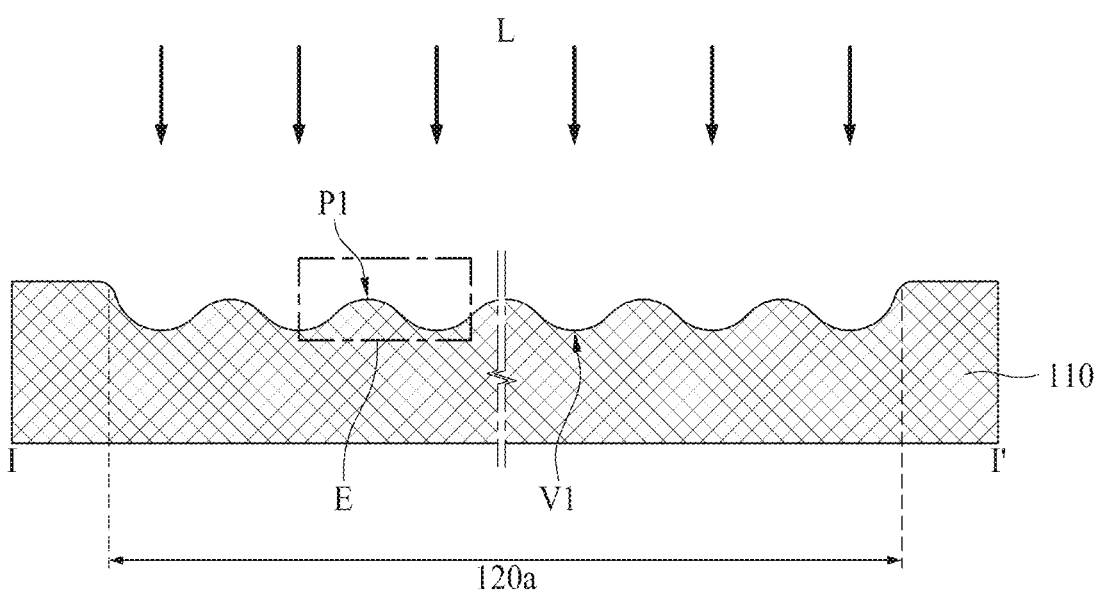
Figure 15E:
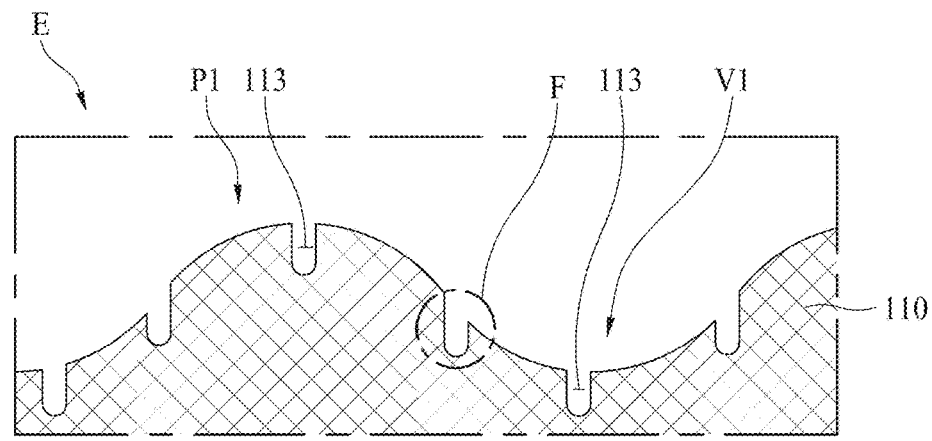

Referring to FIGS. 15D and 15E, the plurality of holes 113 are formed in the surface of the uneven portion 120a. FIG. 15E is an enlarged view showing portion "E" of FIG. 15D. FIG. 15E shows the plurality of holes 113 formed along surfaces of the hill P1 and the valley V1 of the uneven portion 120a. According to an embodiment of the present invention, the forming of the holes 113 may include irradiating a laser L on the uneven portion 120a.

For example, the holes 113 may be formed in the uneven portion 120a by irradiating the laser L to surface-treat the uneven portion 120a. The laser L in the form of a point light source may be used as the laser L for forming the holes 113, and the hole 113 corresponds to a portion on which the laser L is irradiated.

Due to the presence of the hole 113, a micro roughness of the uneven portion 120a may be increased so that an adhesive force between the conductive pattern 120 formed on the uneven portion 120a and the base frame 110 may be improved.

According to an embodiment of the present invention, the intensity and irradiation density of the laser L are adjusted to improve the adhesive force between the conductive pattern 120 and the base frame 110. Specifically, depths of the holes 113 and a distance between the holes 113 may be adjusted by adjusting the intensity and irradiation density of the laser L.

According to an embodiment of the present invention, the hole 133 is formed to have a depth ranging from 3 μm to 30 μm. Further, a distance between adjacent holes 113 among the plurality of holes 113 is adjusted in a range of 5 μm to 10 μm.

When the depth of the hole 113 is less than 3 μm, a degree of an increase in micro roughness of the uneven portion 120a is insignificant, and an adhesive force between the base frame 110 and the conductive pattern 120 is scarcely improved. On the other hand, when the depth of the hole 113 exceeds 30 μm, due to the excessive depth of the hole 113, the conductive pattern 120 may not be formed to extend to a bottom of the hole 113, an adhesive force between the base frame 110 and the conductive pattern 120 may be lowered, and durability of the base frame 110 may also be lowered.

When the hole 113 is formed by irradiating the laser L, the intensity of the laser L is adjusted such that the depth of the hole 113 is in a range of 3 μm to 30 μm. The irradiation density of the laser L is adjusted such that the distance between adjacent holes 113 is in a range of 5 μm to 10 μm.

Accordingly, the intensity of the laser L may be changed according to a type of a material constituting the base frame 110. Even when the type of the material constituting the base frame 110 is changed, the intensity of the laser L is adjusted such that the depth of the hole 113 is in a range of 3 μm to 30 μm.

Figure 15F:
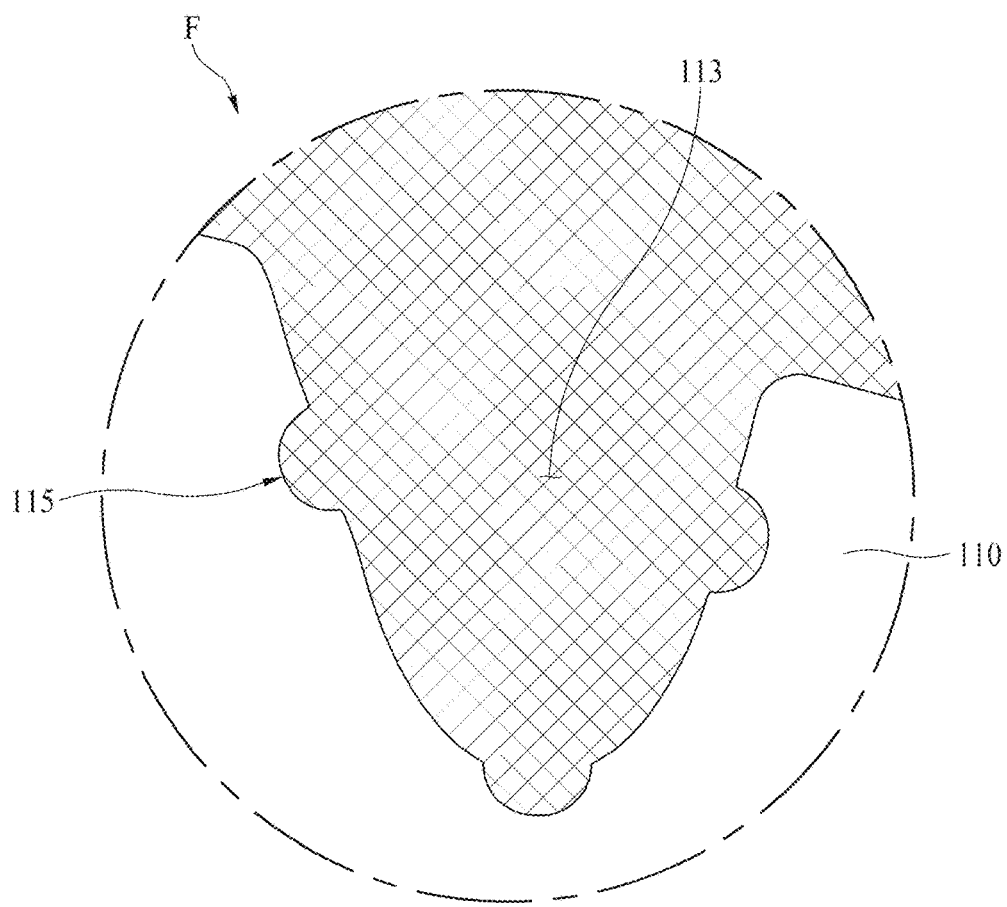

Referring to FIG. 15F, the pore 115 is formed in the surface of the hole 113. FIG. 15F is an enlarged view showing portion "F" of FIG. 15E.

As shown in FIGS. 15E and 15F, the base frame 110 has the hole 113 formed in the uneven portion 120a and the pore 115 formed in the surface of the hole 113.

According to an embodiment of the present invention, the forming of the pore 115 includes treating the base frame 110 with a solvent after the hole 113 is formed.

In the process of forming the holes 113 by irradiating the laser L on the uneven portion 120a, decomposition or degradation of components due to an influence of the laser L may be generated at a portion adjacent to the hole 113. When the base frame 110 is treated with a solvent, decomposed or degraded portions of the base frame 110 may be removed to form the pores 115.

Due to the formation of the pores 115, a micro roughness of the base frame 110 may be increased, and thus, an adhesive force between the base frame 110 and the conductive pattern 120 may be improved.

According to an embodiment of the present invention, the pore 115 may have a depth ranging from 0.3 μm to 3 μm.

When the depth of the pore 115 is less than 0.3 μm, a degree of an increase in micro roughness of the uneven portion 120a is insignificant, and thus, an adhesive force between the base frame 110 and the conductive pattern 120 is scarcely improved. On the other hand, when the depth of the pore 115 exceeds 3 μm, due to the excessive depth of the pore 115, durability of the base frame 110 may be lowered.

After the laser L is irradiated, the solvent is used for cleaning the base frame 110 and forming the pores 115 by removing the degraded portions. The solvent may be used particularly for cleaning a surface of the base frame 110. In order to perform smooth cleaning and adjust a size of the pore 115, a composition and pH of the solvent may be adjusted.

In order to clean the base film 110 and remove the degraded portions, for example, a solvent including a sulfuric acid ($H_2SO_4$) and water ($H_2O$) may be used. Specifically, the solvent may include 50 mL to 200 mL of a sulfuric acid ($H_2SO_4$) per liter (L) of water ($H_2O$).

According to an embodiment of the present invention, the solvent may have an acidity ranging from pH 0.5 to pH 5. When the pH of the solvent is less than 0.5, due to strong acidity of the solvent, the pore 115 having a depth exceeding 3 μm may be formed. When the pH of the solvent exceeds 5, due to weak acidity of the solvent, the pore 115 may be difficult to form, or cleaning efficiency may be lowered. The pH of the solvent may be changed according to components constituting the base frame 110.

According to an embodiment of the present invention, the treating of the base frame 110 with the solvent may include immersing the base frame 110 in the solvent and applying ultrasonic waves having a frequency ranging from 20 Hz to 50 Hz.

The forming efficiency of the pores 115 and the cleaning efficiency may be improved by applying the ultrasonic waves.

When the frequency of the applied ultrasonic waves is less than 20 Hz, an effect of increasing the forming efficiency of the pores 115 and the cleaning efficiency may scarcely occur. On the other hand, when the frequency of the applied ultrasonic waves exceeds 50 Hz, the pore 115 larger than necessary may be formed. More specifically, ultrasonic waves having a frequency ranging from 20 Hz to 30 Hz may be applied to the solvent in treating the base frame 110 with the solvent.

In cleaning the base frame 110 and removing the degraded portions, a temperature of the solvent may be maintained in a range of 45° C. to 55° C. When the temperature of the solvent is less than 45° C., the cleaning efficiency is lowered. When the temperature exceeds 55° C., deformation may occur in the base frame 110 and a size of the pore 115 may be abnormally increased due to excessive activity of an acid.

Shapes of the pores 115 are, for example, as shown in FIGS. 8A and 8B. However, there is no particular limitation on the shapes 115a and 115b of the pore 115. In addition to the shapes 115a and 115b shown in FIGS. 8A and 8B, the pores 115 having various other shapes may be formed although all the shapes may not be shown in the drawings.

Next, the conductive pattern 120 is formed on the uneven portion 120a. The conductive pattern 120 is formed on the hill P1 and the valley V1 of the uneven portion 120a and in the hole 113 and the pore 115 formed in the uneven portion 120a.

The forming of the conductive pattern 120 may include forming the first conductor layer 121 on the uneven portion 120a, forming the second conductor layer 122 on the first conductor layer 121, and forming the third conductor layer 123 on the second conductor layer 122.

The forming of the conductive pattern 120 may include, prior to the forming of the first conductor layer 121, forming the seed layer 124 in the pore 115.

Figure 15G:
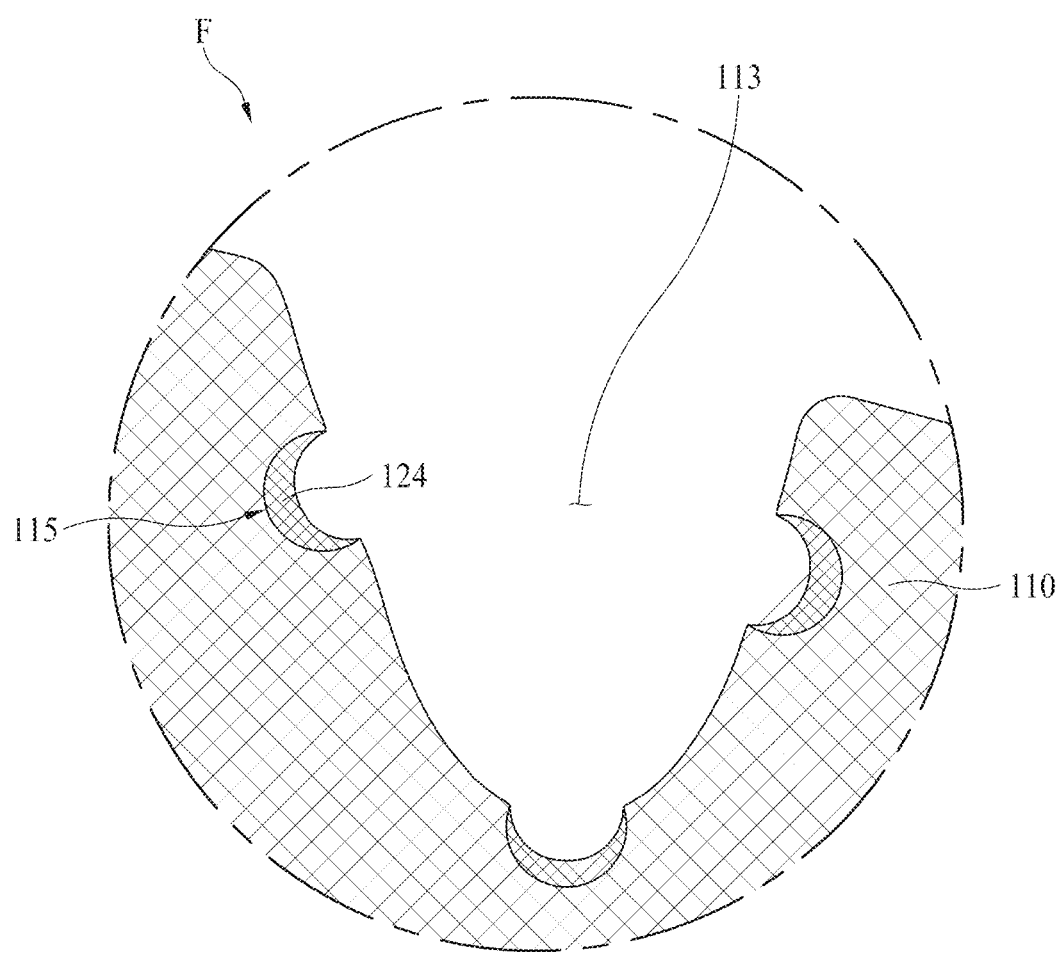

Referring to FIG. 15G, in a process of forming the conductive pattern 120, the seed layer 124 is first formed. The seed layer 124 may be formed through plating.

According to an embodiment of the present invention, the seed layer 124 is disposed in the pore 115. As a result, the conductive pattern 120 may include the seed layer 124 disposed in the pore 115.

A material having a strong adhesive force with respect to a metal and plastic may be used as a material for forming the seed layer 124. Any material may be used as a material for forming the seed layer 124 without limitation as long as the material has a strong adhesive force with respect to a metal and plastic. According to an embodiment of the present invention, the seed layer 124 includes, for example, at least one of palladium (Pd) and tin (Sn).

The seed layer 124 improves an adhesive force between the base frame 110 and the conductive pattern 120. The seed layer 124 may be made of a material having a strong adhesive force with respect to an insulator, such as plastic, constituting the base frame 110 as well as other conductors constituting the conductive pattern 120. Accordingly, the base frame 110 and the first conductor layer 121 may be strongly coupled through the seed layer 124 so that the conductive pattern 120 may be stably attached to the base frame 110.

In addition, as shown in FIG. 15G, the seed layer 124 may be disposed in the fine pores 115, and thus, the seed layer 124 may scarcely be peeled off of the base frame 110 and may maintain an attached state. Accordingly, an adhesive force between the base frame 110 and the conductive pattern 120 may be further improved.

According to an embodiment of the present invention, the seed layer 124 may be formed by immersing the base frame 110 in a hydrochloric acid (HCl) solution (plating solution) in which palladium chloride ($PdCl_2$) is dissolved. Alternatively, the seed layer 124 may be formed by immersing the base frame 110 in a sodium hydroxide (NaOH) solution (plating solution) in which tin chloride ($SnCl_2$) is dissolved. The seed layer 124 may be formed using a solution (plating solution) including palladium chloride ($PdCl_2$) and a sulfuric acid ($H_2SO_4$). When the base frame 110 is immersed in an acid solution in which palladium (Pd) is dissolved, the seed layer 124 is formed through plating. In this case, the acid solution in which the palladium (Pd) is dissolved is referred to as a plating solution.

When the seed layer 124 is formed, a temperature of the plating solution is maintained at a temperature ranging from 25° C. to 35° C., and the plating solution is maintained at an acidity ranging from pH 3 to pH 4.

An adhesive force of the conductive pattern 120 is improved by the seed layer 124 so that stability of the antenna module 100 is improved and a defect rate of the antenna module 100 is reduced.

Although not shown, after the seed layer 124 is formed, the method may further include cleaning the base frame 110. Here, a sulfuric acid ($H_2SO_4$) solution having a concentration of about 10% may be used to clean the base frame 110.

During the forming of the pore 115, the forming of the seed layer 124, and the cleaning of the base frame 110, an entrance of the hole 113 is widened, and a boundary surface of the hole 113 is a gradual curve.

Figure 15H:
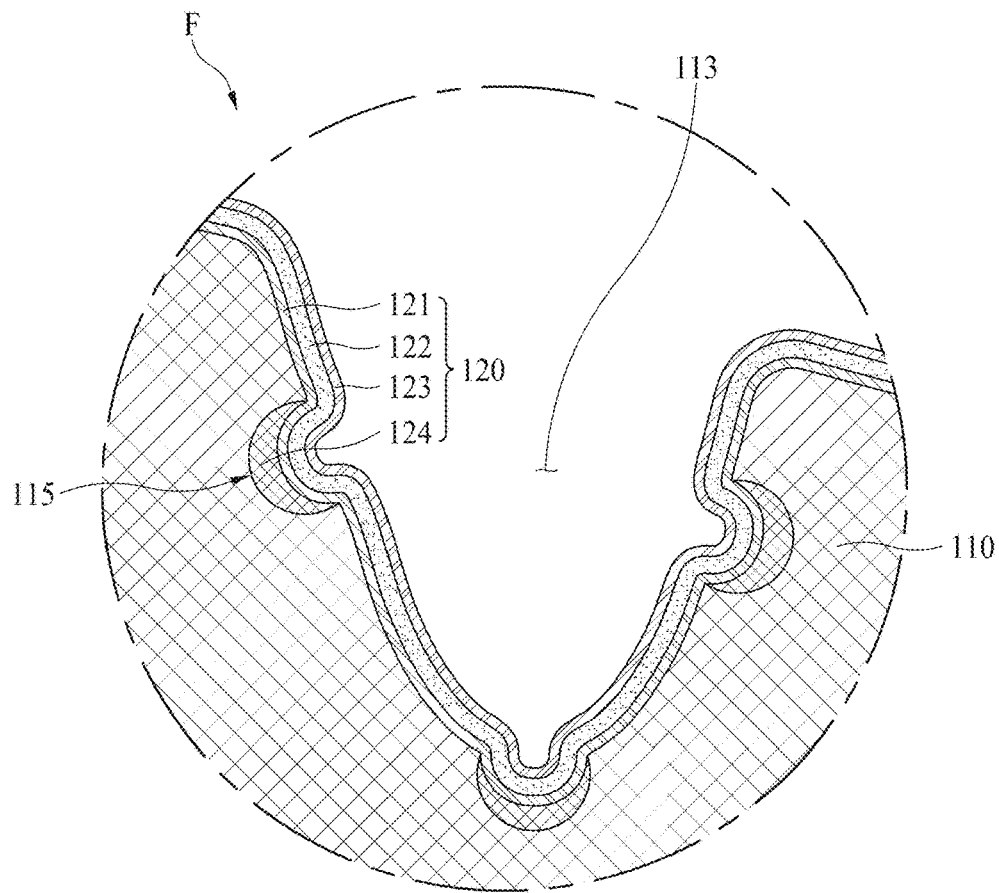
Figure 15I:
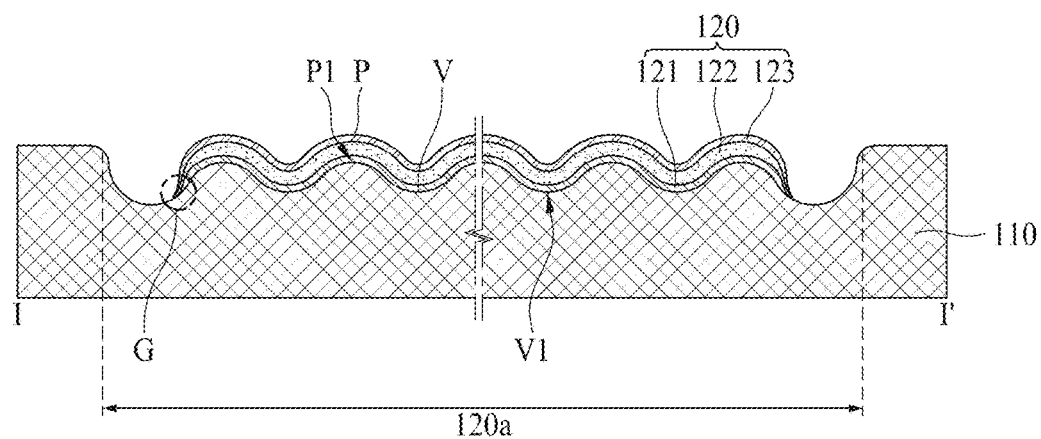

Referring to FIGS. 15H and 15I, the first conductor layer 121 is formed on the uneven portion 120a, the second conductor layer 122 is formed on the first conductor layer 121, and the third conductor layer 123 is formed on the second conductor layer 122. FIG. 15I is a cross-sectional view taken along line II-IF of FIG. 15B.

The first conductor layer 121 may be formed through plating. The first conductor layer 121 may be made of a conductive material having high conductivity with respect to the base frame 110. The first conductor layer 121 may include, for example, at least one of nickel (Ni), molybdenum (Mo), and titanium (Ti). However, the embodiment of the present invention is not limited thereto, and other metals or conductive materials may be used for forming the first conductor layer 121.

According to an embodiment of the present invention, the first conductor layer 121 may be made through nickel (Ni) plating. There is no particular limitation on a nickel (Ni) plating method, and a known nickel (Ni) plating method may be applied. For example, the first conductor layer 121 may be formed through plating using nickel (Ni) and sodium hypophosphite ($NaH_2PO_2$). In addition, nickel sulfate ($NiSO_4.6H_2O$), nickel chloride ($NiCl_2.6H_2O$), a boric acid ($H_3BO_3$), or the like may be used for forming the first conductor layer 121.

The first conductor layer 121 may serve to improve an adhesive force between the base frame 110 and the conductive pattern 120. In addition, referring to FIG. 7, the first conductor layer 121 is also formed on the seed layer 124. Since the first conductor layer 121 is formed on the seed layer 124, the base frame 110 and the conductive pattern 120 are not easily separated from each other, and thus, an adhesive force between the base frame 110 and the conductive pattern 120 is further improved.

The first conductor layer 121 has the thickness t1 ranging from 0.2 μm to 2 μm. When the thickness t1 of the first conductor layer 121 is less than 0.2 μm, an adhesive force between the base frame 110 and the conductive pattern 120 may not be sufficient. On the other hand, when the thickness t1 of the first conductor layer 121 exceeds 2 μm, the thickness of the conductive pattern 120 is increased more than necessary, which is disadvantageous for thinning. More specifically, the first conductor layer 121 may have the thickness t1 ranging from 0.5 μm to 1 μm.

The second conductor layer 122 may be formed through plating. The second conductor layer 122 may be made of a material having high conductivity. The second conductor layer 122 may include, for example, at least one of copper (Cu) and aluminum (Al). However, the embodiment of the present invention is not limited thereto, and other metals or conductive materials may be used for forming the second conductor layer 122.

According to an embodiment of the present invention, the second conductor layer 122 may be formed through copper (Cu) plating. There is no particular limitation on a copper (Cu) plating method, and a known copper (Cu) plating method may be applied. For example, for the copper (Cu) plating, sodium (NaOH), formaldehyde (HCHO), and the like may be used together with copper (Cu).

The second conductor layer 122 serves as a main conductor which transmits and receives radio waves.

The second conductor layer 122 has the thickness t2 ranging from 8 μm to 17 μm. When the thickness t2 of the second conductor layer 122 is less than 8 μm, electrical conductivity of the conductive pattern 120 may not be sufficient. On the other hand, when the thickness t2 of the second conductor layer 122 exceeds 17 μm, the thickness t2 of the conductive pattern 120 is increased more than necessary, which is disadvantageous for thinning. More specifically, the second conductor layer 122 may have the thickness t2 ranging from 9 μm to 15 μm.

The third conductor layer 123 may be formed through plating. The third conductor layer 123 may be made of a material having conductivity and high resistance to corrosion or degeneration. The third conductor layer 123 may include, for example, at least one of nickel (Ni), molybdenum (Mo), and titanium (Ti). However, the embodiment of the present invention is not limited thereto, and other metals or conductive materials may be used for forming the third conductor layer 123.

According to an embodiment of the present invention, the third conductor layer 123 may be made through nickel (Ni) plating. There is no particular limitation on a nickel (Ni) plating method, and a known nickel (Ni) plating method may be applied. For example, the third conductor layer 123 may be formed through plating using nickel (Ni) and sodium hypophosphite ($NaH_2PO_2$). In addition, nickel sulfate ($NiSO_4.6H_2O$), nickel chloride ($NiCl_2.6H_2O$), a boric acid ($H_3BO_3$), or the like may be used for forming the third conductor layer 123.

The third conductor layer 123 may serve to protect the second conductor layer 122 and the conductive pattern 120.

The third conductor layer 123 may have the thickness t3 ranging from 1 μm to 7 μm. When the thickness t3 of the third conductor layer 123 is less than 1 μm, the second conductor layer 122 may not be sufficiently protected. On the other hand, when the thickness t3 of the third conductor layer 123 exceeds 7 μm, the thickness of the conductive pattern 120 is increased more than necessary, which is disadvantageous for thinning. More specifically, the third conductor layer 123 may have the thickness t3 ranging from 2 μm to 5 μm.

Figure 16:
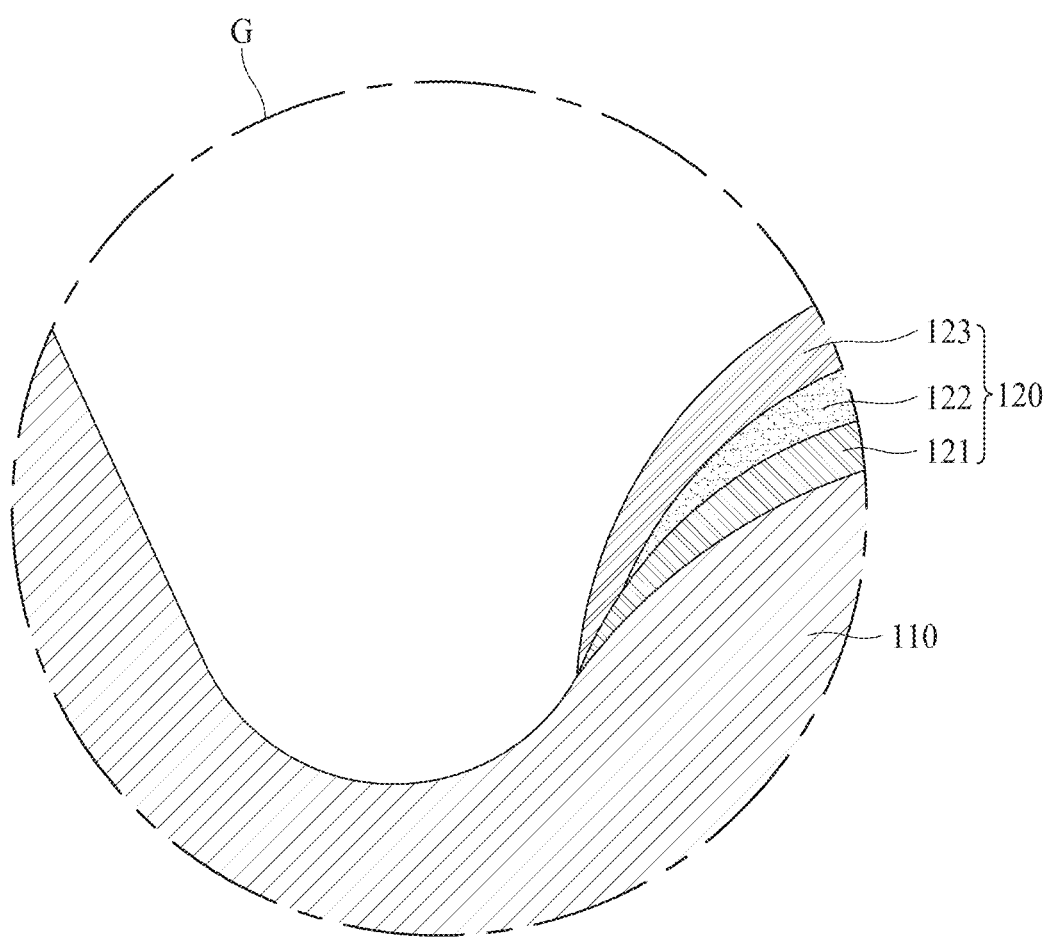
FIG. 16 is an enlarged view showing portion "G" of FIG. 15I.

FIG. 16 is an enlarged view showing portion "G" of FIG. 15I. FIG. 16 corresponds to FIG. 5.

Referring to FIG. 16, the first conductor layer 121 and the third conductor layer 123 may be in contact with each other at an edge of the conductive pattern 120. In particular, when the first conductor layer 121 and the third conductor layer 123 are made of the same material, in a process of forming the third conductor layer 123, the third conductor layer 123 may be connected to the first conductor layer 121 thereunder in a region outside the second conductor layer 122. As a result, as shown in FIG. 16, the first conductor layer 121 and the third conductor layer 123 may be in contact with each other at the edge of the conductive pattern 120 to form a closed space, and the second conductor layer 122 may be disposed in the closed space formed by the first conductor layer 121 and the third conductor layer 123. Therefore, the second conductor layer 122 may be efficiently protected.

The conductive pattern 120 disposed on the uneven portion 120a of the base frame 110 has a surface shape substantially the same as a surface shape of the uneven portion 120a. Specifically, the uneven portion 120a has a surface profile, and the conductive pattern 120 has the same surface profile as the uneven portion 120a. Since the conductive pattern 120 is formed as a thin film, the surface profile of the uneven portion 120a is reflected in the conductive pattern 120.

As a result, as shown in FIG. 15I, a convex portion P of the conductive pattern 120 is formed on the hill P1 of the base frame 110, and a concave portion V of the conductive pattern 120 is formed on the valley V1 of the base frame 110. A profile of the hole 113 formed in the surface of the uneven portion 120a and a profile of the pore 115 formed in the hole 113 also affect the surface profile of the conductive pattern 120.

The surface of the conductive pattern 120 according to the embodiment of the present invention may have an areal roughness expressed by an arithmetical mean height Sa ranging from 4.7 μm to 5.7 μm and a maximum height Sz ranging from 40 μm to 55 μm.

When the arithmetical mean height Sa of the surface of the conductive pattern 120 is less than 4.7 μm, a surface roughness of an interface between the base frame 110 and the conductive pattern 120 is low. In this case, adhesion between the base frame 110 and the conductive pattern 120 may be lowered.

On the other hand, when the arithmetical mean height Sa of the surface of the conductive pattern 120 exceeds 5.7 μm, the interface between the base frame 110 and the conductive pattern 120 is excessively rough. Film stability of the conductive pattern 120 may be lowered, resulting in disconnection, short circuit, or the like.

When the maximum height Sa of the surface of the conductive pattern 120 is less than 40 μm, a surface roughness of the interface between the base frame 110 and the conductive pattern 120 may be low, and thus, adhesion between the base frame 110 and the conductive pattern 120 may be lowered On the other hand, when the maximum height Sz of the surface of the conductive pattern 120 exceeds 55 μm, a height difference between the convex portion P and the concave portion V is large, and an adhesive force and film stability of the conductive pattern 120 may be lowered. Therefore, according to an embodiment of the present invention, the conductive pattern 120 is formed such that the surface thereof has a maximum height Sz ranging from 40 μm to 55 μm.

The antenna module 100 manufactured through the above-described method according to another embodiment of the present invention may be applied to various terminals which transmit and receive radio waves and, particularly, to portable terminals such as mobile phones, tablet PCs, and notebook computers.

Still another embodiment of the present invention provides a method of manufacturing an antenna module 100, the method including manufacturing a base frame 110 having a radiator region and forming a radiator in the radiator region. Here, the radiator is the same as the conductive pattern 120 shown in FIG. 2. The radiator region is a region in which the conductive pattern 120 shown in FIG. 2 is formed and corresponds to a region of the uneven portion 120a of FIG. 15A.

According to still another embodiment of the present invention, the manufacturing of the base frame 110 includes forming an uneven portion 120a having hills P1 and valleys V1, forming a plurality of holes 113 in surfaces of the hill P1 and the valley V1, and forming pores 115 in a surface of the hole 113.

The forming of the radiator may include forming a first conductor layer 121 on an uneven portion 120a, forming a second conductor layer 122 on the first conductor layer 121, and forming a third conductor layer 123 on the second conductor layer 122.

In addition, a surface of the radiator is manufactured to have an areal roughness expressed by an arithmetical mean height Sa ranging from 4.7 μm to 5.7 μm and a maximum height Sz ranging from 40 μm to 55 μm. In addition, the radiator is manufactured to include three to seven convex portions P and three to seven concave portions V per a length of 500 μm in any one direction.

The first conductor layer 121 and the third conductor layer 123 are in contact with each other at an edge of the radiator. Specifically, the first conductor layer 121 and the third conductor layer 123 are in contact with each other at the edge of the radiator to form a closed space, and the second conductor layer 122 is disposed in the closed space formed by the first conductor layer 121 and the third conductor layer 123.

According to the embodiments of the present invention described above, the conductive pattern of the antenna module is stably attached to the base frame, thereby preventing a defect of the antenna module caused by separation of the radiator. Since the conductive pattern is stably attached to the base frame, a radiator having a fine pattern may be manufactured. In addition, according to the embodiments of the present invention, since a conductive material forming the conductive pattern is prevented from being diffused or remaining unnecessarily, performance of the antenna module is stably maintained.

What is claimed is:

1. An antenna module comprising:
a base frame; and
a conductive pattern disposed on the base frame,
wherein the conductive pattern includes a first conductor layer disposed on the base frame, a second conductor layer disposed on the first conductor layer, and a third conductor layer disposed on the second conductor layer, and
a surface of the conductive pattern has an areal roughness expressed by an arithmetical mean height (Sa) ranging from 4.7 µm to 5.7 µm and a maximum height (Sz) ranging from 40 µm to 55 µm.

2. The antenna module of claim 1, wherein each of the first conductor layer and the third conductor layer includes at least one of nickel (Ni), molybdenum (Mo), and titanium (Ti).

3. The antenna module of claim 1, wherein the first conductor layer has a thickness ranging from 0.2 µm to 2 µm.

4. The antenna module of claim 1, wherein the second conductor layer includes at least one of copper (Cu) and aluminum (Al).

5. The antenna module of claim 1, wherein the second conductor layer has a thickness ranging from 8 µm to 17 µm.

6. The antenna module of claim 1, wherein the third conductor layer has a thickness ranging from 1 µm to 7 µm.

7. The antenna module of claim 1, wherein the first conductor layer and the third conductor layer are in contact with each other at an edge of the conductive pattern.

8. The antenna module of claim 7, wherein a width of the first conductor layer and a width of the third conductor layer are greater than a width of the second conductor layer between one end of the edge at which the first conductor layer and the third conductor layer are in contact with each other and the other end of the edge at which the first conductor layer and the third conductor layer are in contact with each other in any one direction in a plan view.

9. The antenna module of claim 7, wherein a thickness of the edge of the conductive pattern, at which the first conductor layer is in contact with the third conductor layer, is greater than a thickness of each of the first conductor layer and the third conductor layer at portions excluding the edge.

10. The antenna module of claim 1, wherein the first conductor layer and the third conductor layer are in contact with each other at an edge of the conductive pattern to form a closed space, and
the second conductor layer is disposed in the closed space formed by the first conductor layer and the third conductor layer.

11. The antenna module of claim 1, wherein the conductive pattern further includes a seed layer disposed between the base frame and the first conductor layer, and the seed layer includes at least one of palladium (Pd) and tin (Sn).

12. The antenna module of claim 1, wherein the base frame includes an uneven portion having a hill and a valley, and the conductive pattern is disposed on the uneven portion.

13. The antenna module of claim 12, wherein the base frame has a hole formed in surfaces of the hill and the valley of the uneven portion and a pore formed in a surface of the hole.

14. The antenna module of claim 13, wherein the hole has a depth ranging from 3 µm to 30 µm.

15. The antenna module of claim 13, wherein the pore has a depth ranging from 0.3 µm to 3 µm.

16. The antenna module of claim 12, wherein an average of three to seven hills and an average of three to seven valleys per a length of 500 µm are formed in the base frame in any one direction thereof.

17. A method of manufacturing an antenna module, the method comprising:
manufacturing a base frame including an uneven portion with a hill and a valley;
forming a plurality of holes in a surface of the uneven portion;
forming a pore in a surface of the plurality of holes; and
forming a conductive pattern on the uneven portion,
wherein the forming of the conductive pattern includes
forming a first conductor layer on the uneven portion,
forming a second conductor layer on the first conductor layer, and forming a third conductor layer on the second conductor layer.

18. The method of claim 17, wherein the first conductor layer and the third conductor layer are in contact with each other at an edge of the conductive pattern to form a closed space, and
the second conductor layer is disposed in the closed space formed by the first conductor layer and the third conductor layer.

19. The method of claim 17, wherein the forming of the conductive pattern further includes, prior to the forming of the first conductive layer, forming a seed layer in the pore.

20. An electronic device comprising an antenna module including a base frame and a conductive pattern disposed on the base frame,
wherein the conductive pattern includes a first conductor layer, a second conductor layer disposed on the first conductor layer, and a third conductor layer disposed on the second conductor layer, and
a surface of the conductive pattern has an areal roughness expressed by an arithmetical mean height (Sa) ranging from 4.7 µm to 5.7 µm and a maximum height (Sz) ranging from 40 µm to 55 µm.

* * * * *